United States Patent

Matsushiro et al.

(10) Patent No.: US 7,113,414 B2
(45) Date of Patent: Sep. 26, 2006

(54) INVERTER CONTROL DEVICE FOR DRIVING A MOTOR AND AN AIR CONDITIONER

(75) Inventors: Hideo Matsushiro, Kusatsu (JP); Mitsuo Kawaji, Sakata-gun (JP); Tomohiro Sugimoto, Kusatsu (JP); Hideki Nakata, Katano (JP); Mitsuo Ueda, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 266 days.

(21) Appl. No.: 10/809,455

(22) Filed: Mar. 26, 2004

(65) Prior Publication Data

US 2004/0228151 A1 Nov. 18, 2004

(30) Foreign Application Priority Data

Mar. 28, 2003 (JP) ............................. 2003-091184
Feb. 27, 2004 (JP) ............................. 2004-054292

(51) Int. Cl.
*G02F 5/45* (2006.01)
*H02P 5/34* (2006.01)
*H02M 7/122* (2006.01)

(52) U.S. Cl. ........................................ 363/37; 318/801
(58) Field of Classification Search ................ 363/34, 363/37; 318/800–806, 812, 814
See application file for complete search history.

(56) References Cited

U.S. PATENT DOCUMENTS

| | | | | | |
|---|---|---|---|---|---|
| 4,695,938 A | * | 9/1987 | Tada | ........................... | 363/37 |
| 5,663,627 A | * | 9/1997 | Ogawa | ........................ | 318/803 |
| 5,723,968 A | * | 3/1998 | Sakurai | ....................... | 318/802 |
| 6,002,218 A | * | 12/1999 | Toda et al. | .................... | 318/66 |
| 6,337,548 B1 | * | 1/2002 | Kawabata et al. | ........... | 318/439 |
| 6,512,341 B1 | * | 1/2003 | Matsushiro et al. | ......... | 318/254 |
| 6,657,412 B1 | * | 12/2003 | Ishida et al. | ................. | 318/599 |
| 6,822,417 B1 | * | 11/2004 | Kawaji et al. | ............... | 318/701 |
| 6,937,488 B1 | * | 8/2005 | Eguchi | ......................... | 363/97 |
| 6,958,589 B1 | * | 10/2005 | Kawaji et al. | ............... | 318/802 |
| 6,972,541 B1 | * | 12/2005 | Matsushiro et al. | ......... | 318/801 |
| 2004/0217728 A1 | * | 11/2004 | Kawaji et al. | ............... | 318/701 |
| 2004/0246641 A1 | * | 12/2004 | Sugimoto et al. | ........... | 361/91.1 |
| 2005/0007061 A1 | * | 1/2005 | Hofmann et al. | ............ | 318/701 |

FOREIGN PATENT DOCUMENTS

JP 9-266674 10/1997

\* cited by examiner

*Primary Examiner*—Matthew V. Nguyen
(74) *Attorney, Agent, or Firm*—Wenderoth, Lind & Ponack, L.L.P.

(57) ABSTRACT

An inverter control device for driving a motor with small size, light weight and low cost is provided. The inverter control device includes a first motor voltage command corrector that corrects a voltage command of each phase by multiplying the each phase voltage command by a PN voltage correction coefficient, and a second motor voltage command corrector that corrects again the each phase voltage command once corrected by the first motor voltage command corrector, only when any one of the phase voltage commands corrected by the first motor voltage command corrector is larger than the inverter DC voltage, by multiplying the voltage command of each phase corrected by the first motor voltage command corrector by the inverter DC voltage value, and dividing the product of the multiplication by the maximum value of the phase voltage commands corrected by the first motor voltage command corrector.

15 Claims, 19 Drawing Sheets

Fig.3A

| DETECTED DC VOLTAGE | |
|---|---|
| Vpn | 240V |

| FIRST CORRECTED MOTOR VOLTAGE COMMAND | |
|---|---|
| $V_{uh1}^*$ | 200V |
| $V_{vh1}^*$ | 90V |
| $V_{wh1}^*$ | 0V |

→

| SECOND CORRECTED MOTOR VOLTAGE COMMAND | |
|---|---|
| $V_{uh2}^*$ | 200V |
| $V_{vh2}^*$ | 90V |
| $V_{wh2}^*$ | 0V |

Fig.3B

| DETECTED DC VOLTAGE | |
|---|---|
| Vpn | 240V |

| FIRST CORRECTED MOTOR VOLTAGE COMMAND | |
|---|---|
| $V_{uh1}^*$ | 300V |
| $V_{vh1}^*$ | 180V |
| $V_{wh1}^*$ | 0V |

→

| SECOND CORRECTED MOTOR VOLTAGE COMMAND | |
|---|---|
| $V_{uh2}^*$ | 200V |
| $V_{vh2}^*$ | 144V |
| $V_{wh2}^*$ | 0V |

INVERTER CONTROL DEVICE FOR DRIVING A MOTOR AND AN AIR CONDITIONER

BACKGROUND OF THE INVENTION

1. Technical Field

The present invention relates to an inverter control device for driving a motor and an air conditioner.

2. Related Art

As an inverter control device for driving a general induction motor used in a general-purpose inverter, for example, an inverter control device for driving an induction motor of V/F controlled system as shown in FIG. 16 is known (see non-patent document 1).

In FIG. 16, the main circuit is composed of a DC (direct-current) power supply apparatus 113, an inverter 3, and an induction motor 4. The DC power supply apparatus 113 includes an AC (alternating-current) power source 1, a rectifying circuit 2, a smoothing capacitor 112 for accumulating electric energy for the DC voltage source of the inverter 3, and a power factor correcting reactor 111 for the AC power source 1.

On the other hand, a control circuit is composed of a V/F control pattern section 13 for determining the motor voltage value to be applied to the induction motor 4 on the basis of a speed command ω* of the induction motor 4 given from outside, a motor voltage command generator 14 for generating a voltage command of each phase of the induction motor 4 on the basis of the motor voltage value determined in the V/F control pattern section 13, and a PWM controller 18 for generating PWM signals of the inverter 3 on the basis of each phase voltage command generated from the motor voltage command generator 14. An example of general V/F control pattern section 13 is shown in FIG. 17.

As shown in FIG. 17, the motor voltage value to be applied to the induction motor 4 is uniquely determined corresponding to the speed command ω*. Generally, the speed command ω* and motor voltage value are stored as a table value in the memory of the processing unit such as a microcomputer, and the speed command ω* other than the table value is linearly interpolated from the table values, and then a motor voltage value is calculated.

Supposing the AC power source 1 to be 220 V (AC power source frequency 50 Hz), the input of the inverter 3 to be 1.5 kW, and the smoothing capacitor 112 to be 1500 μF, the relation of the harmonic components of the AC power source current and the degree about the AC power source frequency at 5 mH and 20 mH of the power factor correcting reactor 111 is shown in FIG. 18. FIG. 18 also shows the standard of IEC (International Electrotechnical Commission), in which the cubic harmonic component largely exceeds the IEC standard when the power factor correcting reactor 111 is 5 mH, but higher harmonic components of up to the degree of 40 satisfy the IEC standard at 20 mH.

Therefore, to conform to the IEC standard at high load, in particular, the inductance value of the power factor correcting-reactor 111 must be further increased, and the inverter device is increased in size and weight, and the cost is also increased.

Accordingly, as an attempt to suppress increase of inductance value of the power factor correcting reactor 111, and reduce the power source harmonic components and heighten the power factor, a DC power supply unit as shown in FIG. 19 is proposed (for example, see patent document 1).

In FIG. 19, an AC supply voltage of the AC power source 1 is applied to an AC input terminal of a full-wave rectifying circuit composed of bridge connection of diodes D1 to D4, and its output is charged into an intermediate capacitor C by way of a reactor Lin, and the electric charge of this intermediate capacitor C is discharged into a smoothing capacitor CD, and a DC voltage is applied to a load resistance RL. In this case, a transistor Q1 is connected to positive and negative DC current paths connecting the load side of the reactor Lin and the intermediate capacitor C, and this transistor Q1 is driven by a base driving circuit G1.

Pulse generating circuits I1 and I2 for applying a pulse voltage to the base driving circuit G1, and a dummy resistance Rdm are further provided. The pulse generating circuits I1, I2 are composed of a circuit for detecting the zero cross point of AC supply voltage, and a pulse current circuit for causing a pulse current to flow through the dummy resistance Rdm until the momentary value of the AC supply voltage becomes equal to the voltage across the intermediate capacitor C from the time zero cross point is detected.

Herein, the pulse generating circuit I1 generates a pulse voltage in the front half of a half cycle of the AC supply voltage, and the pulse generating circuit I2 generates a pulse voltage in the latter half of a half cycle of the AC supply voltage.

When flowing a current by force to the reactor Lin by turning on the transistor Q1, a reverse flow preventive diode D5 is connected so that the electric charge in the intermediate capacitor C may not be discharged through the transistor Q1, and further in the path of discharging the electric charge of the intermediate capacitor C into the smoothing capacitor, a reverse flow preventive diode D6 and a reactor Ldc for enhancing the smoothing effect are connected in series.

In this configuration, by turning on the transistor Q1 in part or all of a phase interval in which the momentary value of the AC supply voltage does not exceed the voltage across the intermediate capacitor C, reduction of harmonic components and improvement of power factor can be achieved while preventing the device size from increasing.

Patent document 1: Japanese Laid-open Patent Publication No. 9-266674.

Non-patent document 1: "Inverter Drive Handbook", pages 661–711 (ed. by Inverter Drive Handbook Editors Committee, first edition, 1995, Nikkan Kogyo Shimbunsha).

In the conventional configuration, however, large capacity of the smoothing capacitor CD and reactor Lin are still required (patent document 1 discloses results of simulation at 1500 μF, 6.2 mH), it also includes the intermediate capacitor C, transistor Q1, base driving circuit G1, pulse generating circuits I1, I2, dummy resistance Rdm, reverse flow preventive diodes D5, D6, and smoothing effect enhancing reactor Ldc, and therefore the device is large in size and great in the number of parts, and hence the cost is increased.

SUMMARY OF THE INVENTION

The invention is devised to solve the problems of the prior art, and it is hence an object thereof to present an inverter control device for driving a motor of small size, light weight, and low cost.

In the first aspect of the invention, an inverter control device for driving a motor according to the invention includes a rectifying circuit for converting an AC power from an AC power source into a DC power, and an inverter for converting the DC power from the rectifying circuit into an AC power with a desired frequency and a desired voltage to supply the converted AC power into a motor. The rectifying circuit includes a diode bridge, and a reactor of a predetermined small capacity connected to the AC input side or DC output side of the diode bridge. A capacitor with a predetermined small capacity is provided for absorbing the regenerative energy of the motor between DC buses of the inverter.

The inverter control device includes a motor voltage command generator that generates a voltage command of each phase of the motor on the basis of a speed command of the motor given from outside, a PN voltage detector that detects a DC voltage of the inverter, a PN voltage corrector that compares the inverter DC voltage detected by the PN voltage detector with a predetermined reference value, and calculating a PN voltage correction coefficient from the result of the comparison, a first motor voltage command corrector that corrects the each phase voltage command, and a second motor voltage command corrector that corrects again the each phase voltage command corrected by the first motor voltage command corrector.

The first motor voltage command corrector corrects the each phase voltage command by multiplying the each phase voltage command obtained from the motor voltage command generator by the PN voltage correction coefficient produced from the PN voltage corrector. The second motor voltage command corrector corrects again the each phase voltage command once corrected by the first motor voltage command corrector, only when any one of the phase voltage commands corrected by the first motor voltage command corrector is larger than the inverter DC voltage, by multiplying the voltage command of each phase corrected by the first motor voltage command corrector by the inverter DC voltage value, and dividing the product of the multiplication by the maximum value of the phase voltage commands corrected by the first motor voltage command corrector.

In this configuration, by using a capacitor of small capacity and a reactor of small capacity, an inverter control device for driving a motor is realized in small size, light weight, and low cost. If the inverter direct-current voltage fluctuates largely and motor driving is difficult or even impossible, the inverter is operated so that the voltage applied to the motor may be almost constant, and driving of the motor may be maintained, and further by suppressing fluctuations of alternating-current supply voltage, the alternating-current power source power factor can be improved and the harmonic components of the alternating-current power source current can be suppressed.

In the second aspect of the invention, an inverter control device for driving a motor includes a rectifying circuit for converting an AC power from an AC power source into a DC power, and an inverter for converting the DC power from the rectifying circuit into an AC power with a desired frequency and a desired voltage to supply the converted AC power into a motor. The rectifying circuit includes a diode bridge and a reactor with a predetermined small capacity connected to the AC input side or DC output side of the diode bridge. A capacitor with a predetermined small capacity is provided for absorbing the regenerative energy of the motor between DC buses of the inverter.

The inverter control device a motor voltage command generator that generates a voltage command of each phase of the motor on the basis of a speed command of the motor given from outside a PN voltage detector that detects a DC voltage of the inverter, a PN voltage corrector that compares the inverter DC voltage detected by the PN voltage detector with a predetermined reference value, and calculating a PN voltage correction coefficient from the result of the comparison, a first motor voltage command corrector that corrects the voltage command of each phase by multiplying the each phase voltage command obtained from the motor voltage command generator by the PN voltage correction coefficient produced from the PN voltage corrector, saturation voltage operating section that calculates a reference saturation voltage by multiplying the inverter DC voltage by a value of 1 or more, a second motor voltage command corrector that corrects again the voltage command of each phase corrected by the first motor voltage command corrector, only when any one of the phase voltage commands calculated by the first motor voltage command corrector is larger than the reference saturation voltage calculated in the saturation voltage operating section, by multiplying the voltage command of each phase value corrected by the first motor voltage command corrector by the reference saturation voltage calculated in the saturation voltage operating section, and dividing the product of the multiplication by the maximum value of the phase voltage commands corrected by the first motor voltage command corrector, and a motor voltage command maximum value limiting section that determines the voltage command of each phase as the inverter DC voltage when the voltage command of each phase corrected by the second motor voltage command corrector is larger than the inverter DC voltage.

In this configuration, the motor output torque can be enhanced while improving the power factor of the alternating-current power source and suppressing harmonic components.

In the second aspect, the PN voltage corrector may calculate the PN voltage correction coefficient by dividing the predetermined reference value by the detected DC voltage when the detected DC voltage is not zero, and set the maximum value of the predetermined PN voltage correction coefficient to the PN voltage correction coefficient when the detected DC voltage is below zero. This configuration realizes both an operating region for improving the power factor of the alternating-current power source and suppressing harmonic components of the alternating-current power source current, and an operating region for enhancing the motor output torque substantially.

In the first or second aspect, the PN voltage corrector may calculate the PN voltage correction coefficient by dividing the predetermined reference value by the detected DC voltage, and especially may set the maximum value of the predetermined PN voltage correction coefficient to the PN voltage correction coefficient when the detected DC voltage is below zero. In this configuration, if the inverter direct-current voltage fluctuates largely to be below zero, driving of the motor can be maintained.

In the first or second aspect, an inverter operating frequency may be set so as to prevent the inverter operating frequency from stationary fixing in a frequency range having a predetermined margin around the resonant frequency which is a frequency of an even number multiple of AC power source frequency. In this configuration, a resonance phenomenon of inverter frequency and alternating-current power source frequency is avoided, and therefore unstable operation of the motor is prevented and stable driving is realized.

In the first or second aspect, combination of the small capacity reactor and the small capacity capacitor may be determined so that the resonant frequency of the small capacity reactor and the small capacity capacitor is larger than 40 times of the AC power source frequency. In this configuration, harmonic components of the alternating-current power source current are suppressed, and the IEC standard is satisfied.

In the first or second aspect, the capacity of the small capacity capacitor may be determined so that the maximum value of the DC voltage elevating when the inverter is stopped is smaller than withstand voltages of electric devices included in peripheral circuits of the inverter. By determining the capacity of the small capacity capacitor so that the maximum value of the inverter direct-current voltage may be smaller than the withstand voltage of the driving elements, breakdown of peripheral circuits can be prevented.

In the first or second aspect, the carrier frequency of the inverter may be determined so that a power factor value of the AC power source is a predetermined value. In this constitution, the predetermined power factor value of the alternating-current power source can be satisfied, and by setting the minimum required carrier frequency, the inverter loss can be suppressed to a lowest limit.

According to the present invention, since each phase voltage command value is corrected appropriately, a capacitor of small capacity and a reactor of small capacity can be used. As a result, an inverter control device for driving a motor of small size, light weight and low cost is realized, and if the inverter direct-current voltage fluctuates largely and motor driving is difficult or even impossible, it is possible to maintain stable driving of the motor by operating the inverter so that the voltage applied to the motor may be almost constant. Moreover, by suppressing fluctuations of alternating-current power source current, it is also possible to improve the power factor of alternating-current power source, and suppress harmonic components of alternating-current power source current.

BRIEF DESCRIPTION OF THE DRAWINGS

FIGS. 3A and 3B are diagrams showing results of corrected motor voltage command from the first preferred embodiment of the invention.

DETAIL DESCRIPTION OF THE PREFERRED EMBODIMENTS

Figure 1:
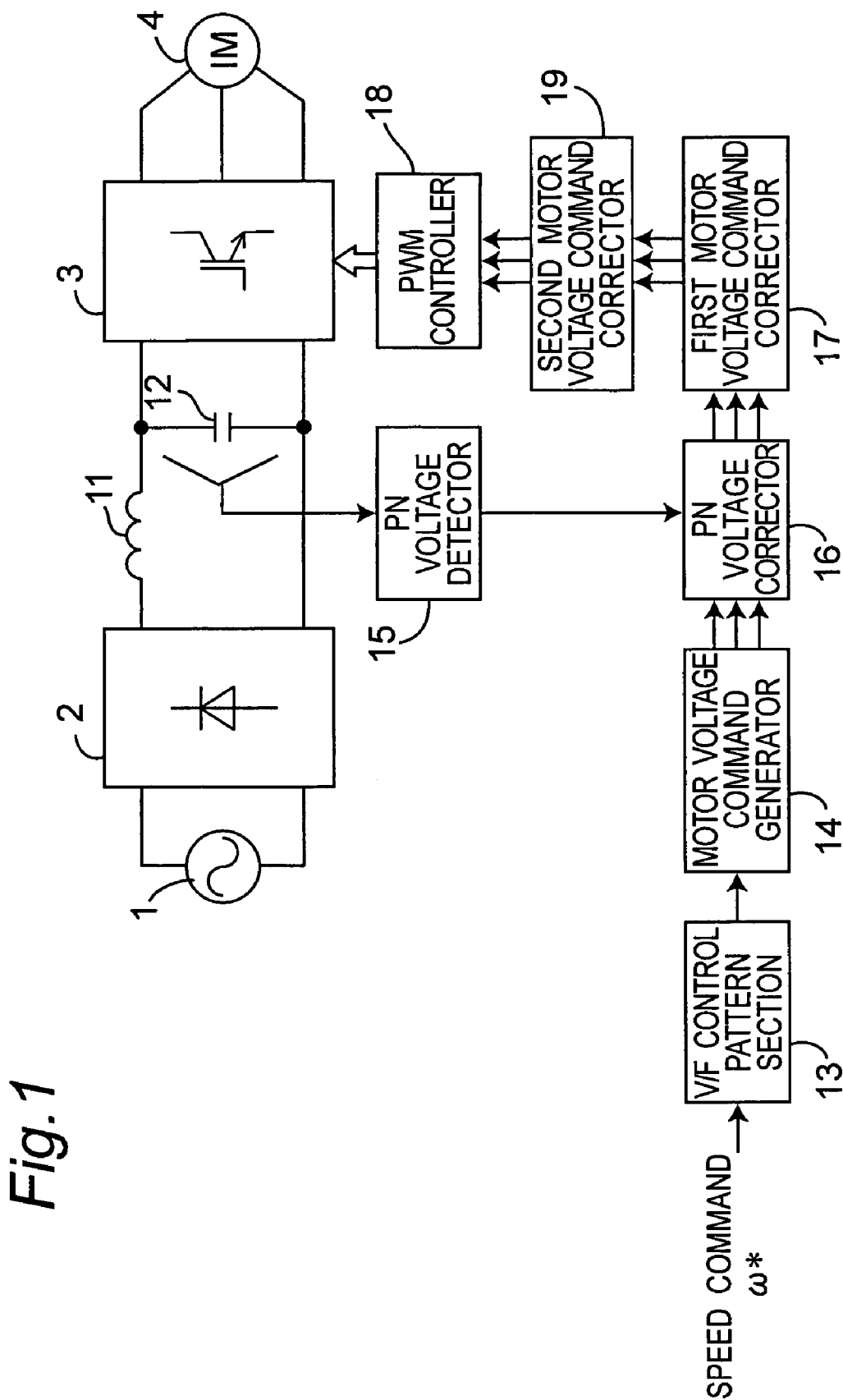
FIG. 1 is a system block diagram of the inverter control device for driving an induction motor in the first preferred embodiment of the invention.

Referring now to the drawings, preferred embodiments of the invention are described below.

Embodiment 1

FIG. 1 is a system block diagram of an inverter control device for driving an induction motor in preferred embodiment 1 of the invention. In FIG. 1, a main circuit of the inverter control device includes an AC power source 1, a diode bridge 2 for converting the AC power into a DC power, a reactor 11 of small capacity of 2 mH or less, a capacitor 12 of small capacity of 100 µF or less, an inverter 3 for converting the DC power into an AC power, and an induction motor 4 driven by the AC power converted by the inverter 3.

On the other hand, a control circuit of the inverter control device includes a V/F control pattern section 13, a motor voltage command generator 14, a PN voltage detector 15, a PN voltage corrector 16, a first motor voltage command corrector 17, a PWM controller 18, and a second motor voltage command corrector 19.

Figure 16:
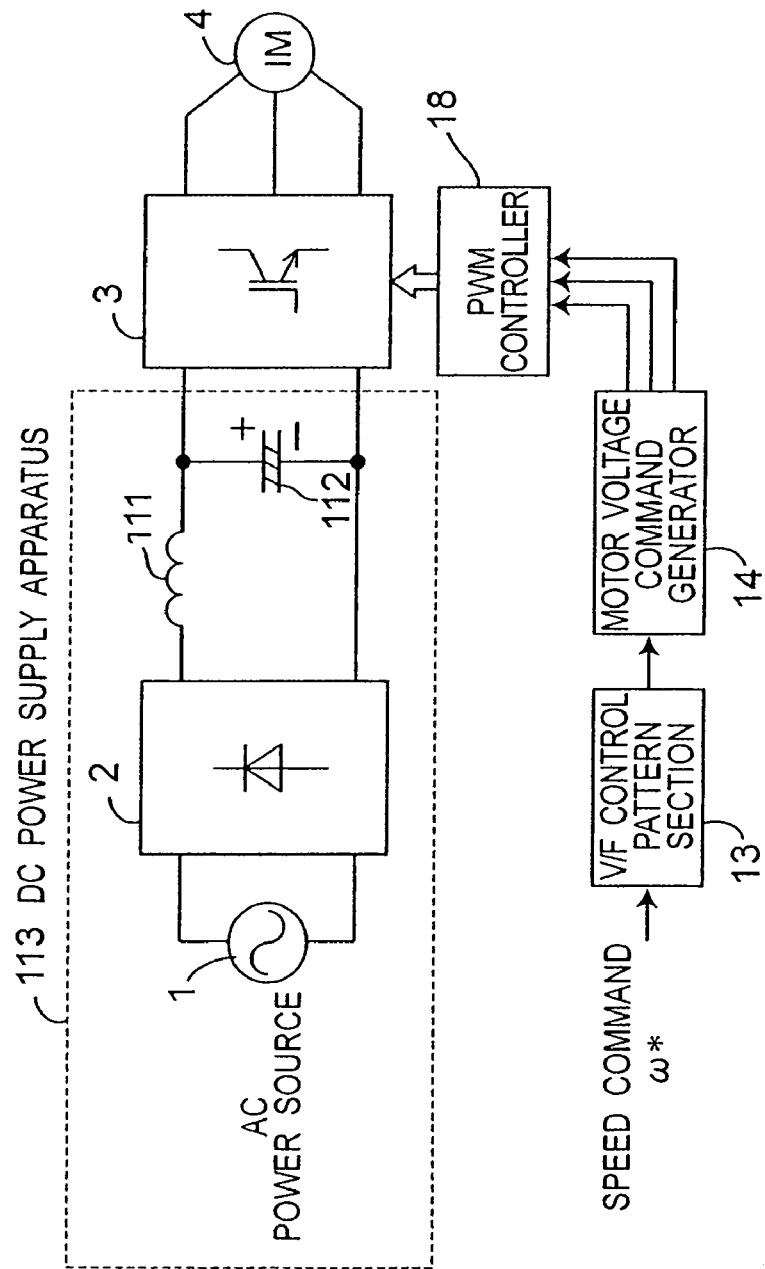
FIG. 16 is a system block diagram of a general inverter control device for driving an induction motor.
Figure 17:
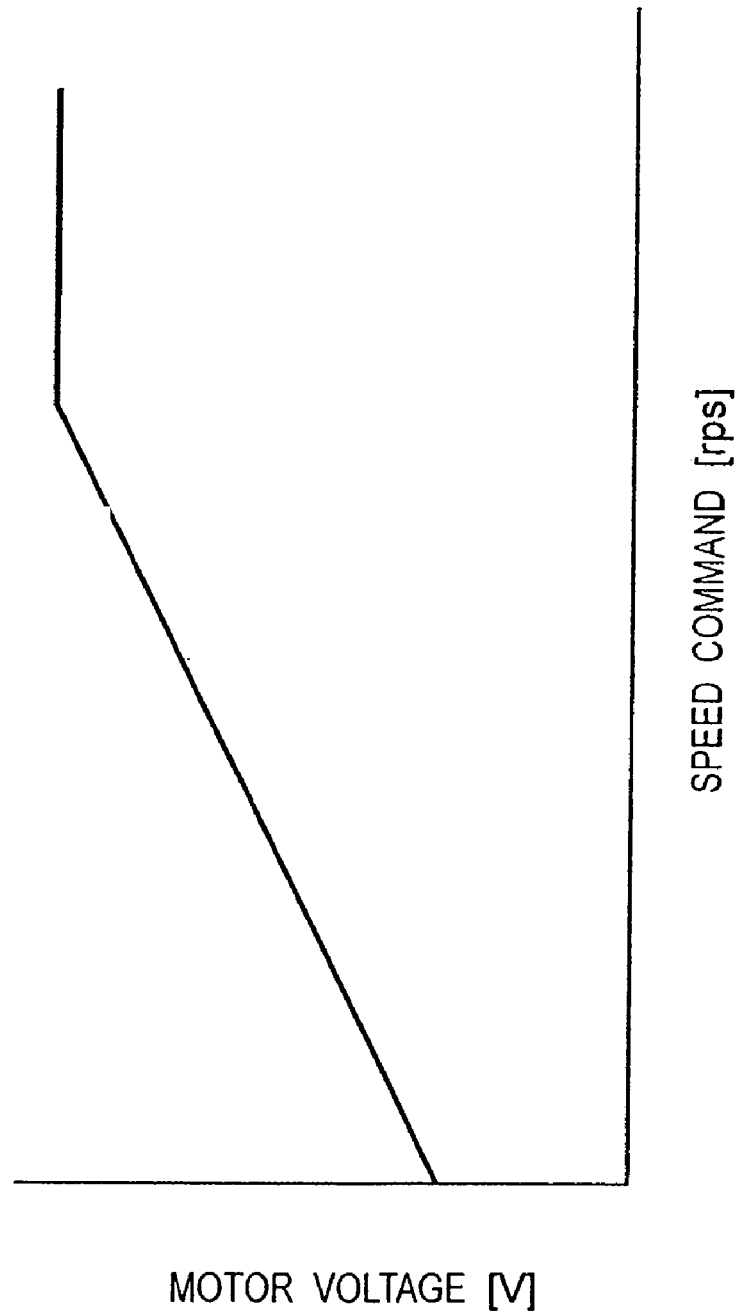
FIG. 17 is a diagram showing an example of general V/F control pattern.
Figure 18:
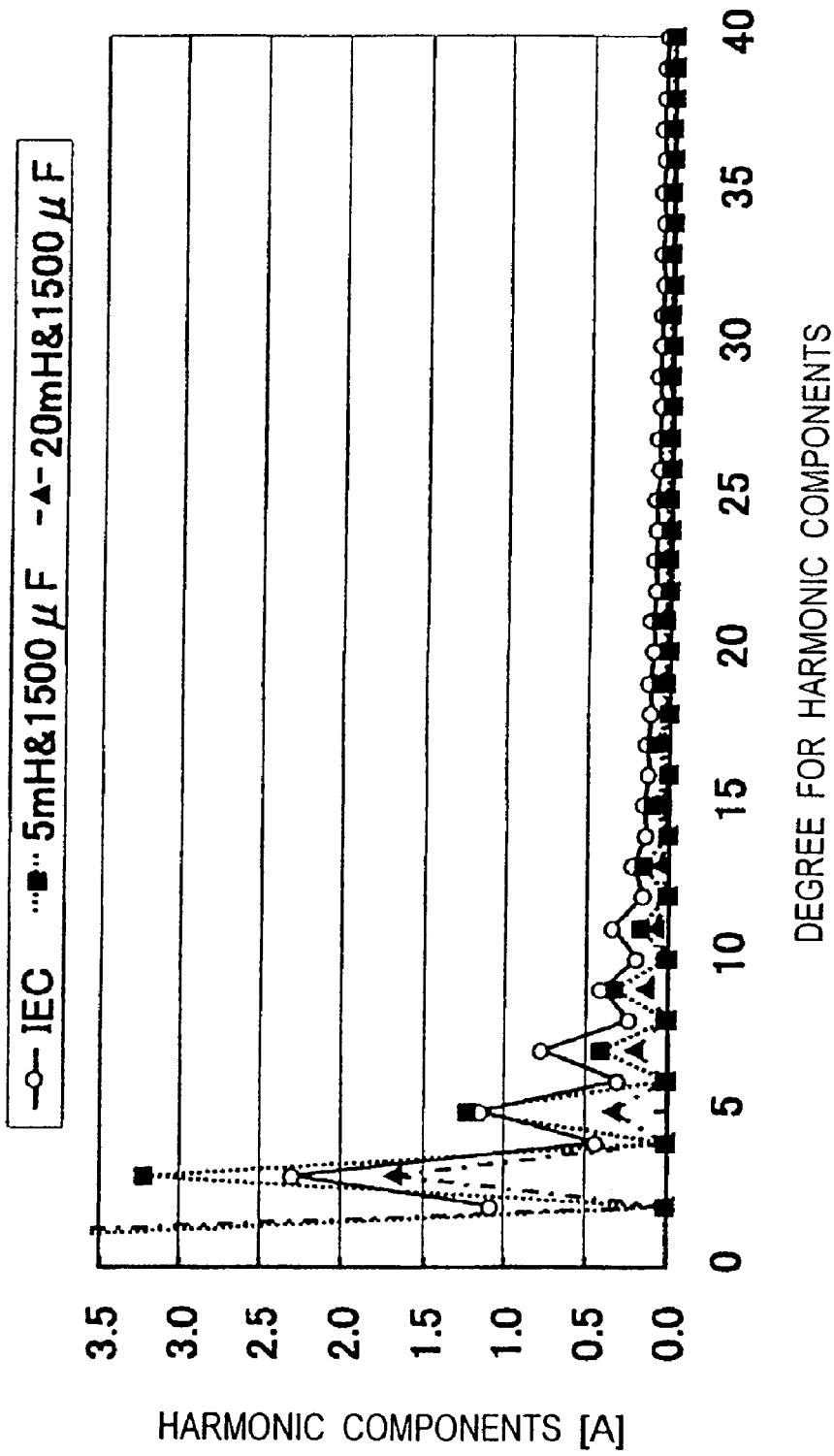
FIG. 18 is a diagram showing the relation of harmonic components of alternating-current power source current and the degree of alternating-current power source frequency in the inverter control device for driving an induction motor shown in FIG. 16.
Figure 19:
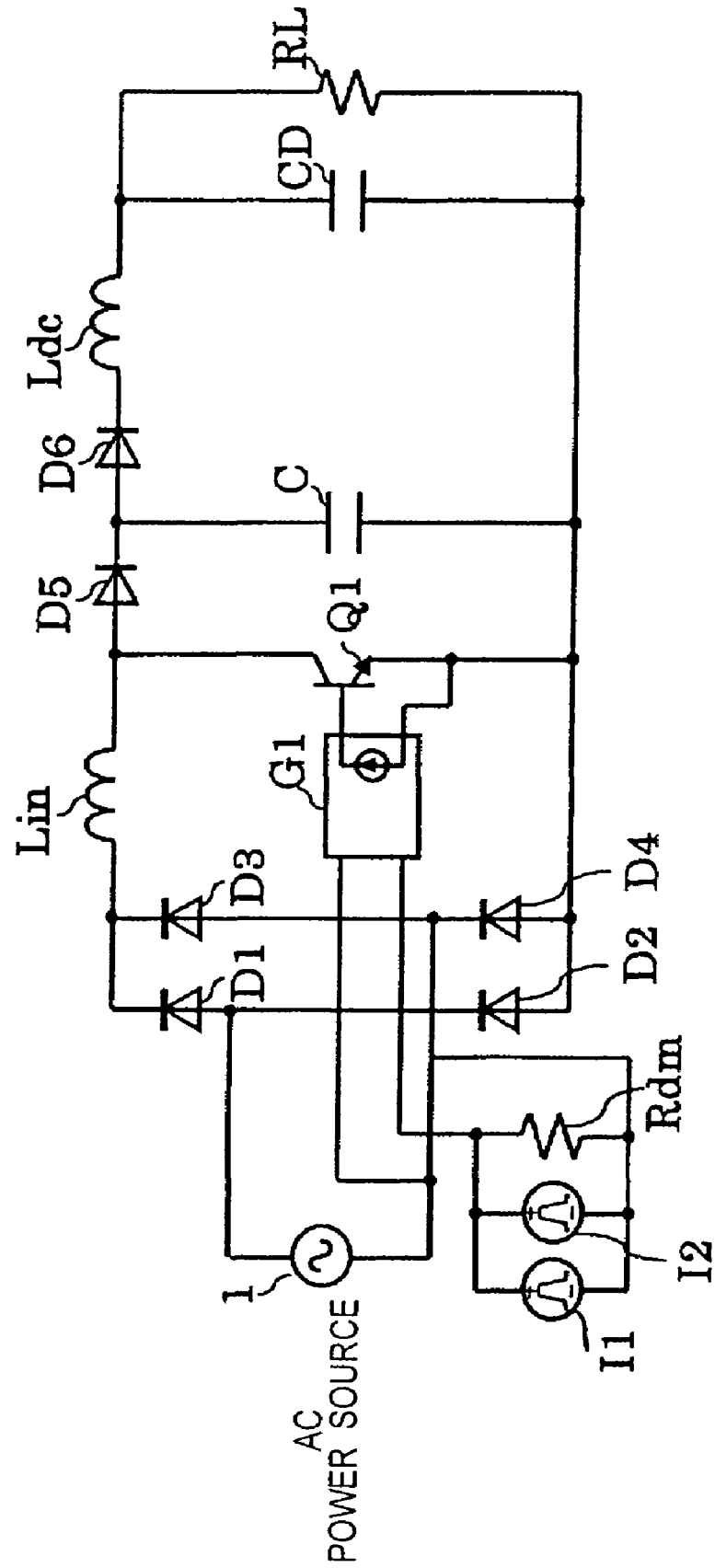
FIG. 19 is a diagram of a conventional DC power supply unit.

The V/F control pattern section 13 determines the motor voltage value to be applied to the induction motor 4 on the basis of the speed command ω* of the induction motor 4 given from outside. The motor voltage command generator 14 generates a voltage command of each phase of the induction motor 4 on the basis of the motor voltage value determined in the V/F control pattern section 13. The PN voltage detector 15 detects the DC voltage of the inverter 3. The PN voltage corrector 16 compares the predetermined reference DC voltage of the inverter 3 with the detected DC voltage of the inverter 3 obtained from the PN voltage detector 15, and calculates the PN voltage correction coefficient. The first motor voltage command corrector 17 multiplies the voltage command of each phase obtained from the motor voltage command generator 14 by the PN voltage correction coefficient produced from the PN voltage corrector 16 to correct the voltage command of each phase value, and generate the first corrected motor voltage command of the induction motor 4. The second motor voltage command corrector 19 generates the second corrected motor voltage command of the induction motor 4, only when any one of the first corrected motor voltage commands generated by the first motor voltage command corrector 17 is larger than the DC voltage of the inverter 3, by multiplying the first corrected motor voltage command by the DC voltage value of the inverter 3, and dividing the product of multiplication by the maximum value of the first corrected motor voltage commands. The PWM controller 18 generates PWM signals of the inverter 3 on the basis of the second motor voltage command correction value generated in the second motor voltage command corrector 19. It should be noted that the V/F control pattern section 13 has already been explained in relation to the related art, and thus its explanation is omitted herein. (See the inverter control device for driving an induction motor of V/F control system in FIG. 16.)

A specific operation of the inverter control device of this preferred embodiment is described below.

The motor voltage command generator 14 generates phase voltage commands $V_u^*$, $V_v^*$, and $V_w^*$ by calculation in formula (1).

$$\begin{cases} V_u^* = V_m \sin\theta_1 \\ V_v^* = V_m \sin(\theta_1 - 2\pi/3) \\ V_v^* = V_m \sin(\theta_1 + 2\pi/3) \end{cases} \quad (1)$$

where $V_m$ is a motor voltage value determined by the V/F control pattern section 13, and $\theta_1$ is calculated by time integration of speed command $\omega^*$ as expressed in formula (2).

$$\theta_1 = \int \omega^* \, dt \quad (2)$$

Figure 2:
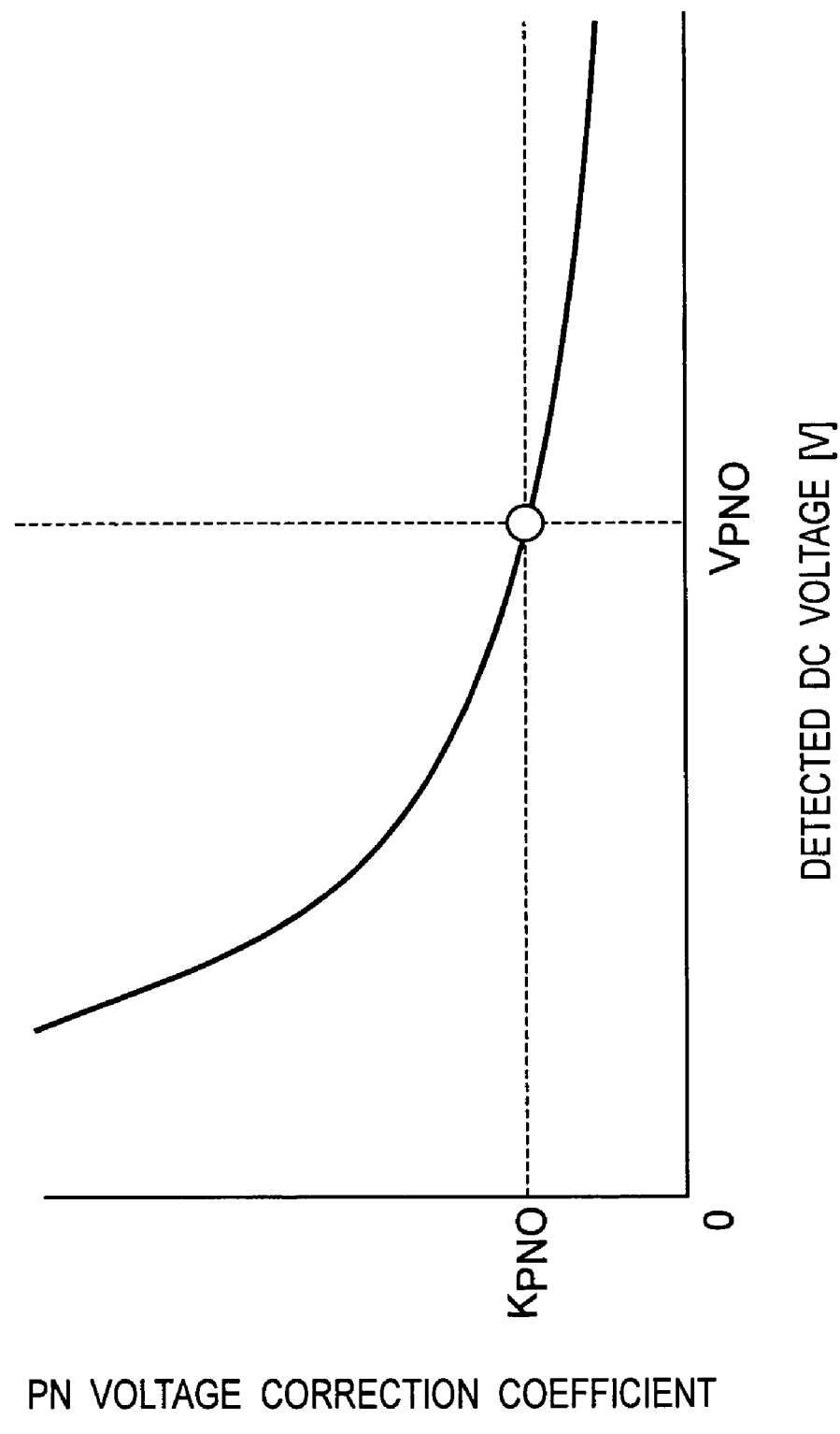
FIG. 2 is a characteristic diagram of PN voltage correcting coefficient in the first preferred embodiment of the invention.

FIG. 2 is a diagram showing a first example of the PN voltage corrector 16, and the PN voltage corrector 16 calculates the PN voltage correction coefficient $k_{pn}$ as shown in formula (3) by using the predetermined reference DC voltage $V_{pn0}$ of the inverter 3 and the detected DC voltage $v_{pn}$ of the inverter 3 obtained from the PN voltage detector 15.

$$k_{pn} = \frac{V_{pn0}}{v_{pn} + \delta_0} \quad (3)$$

Since a capacitor of small capacity is used in the invention, the detected DC voltage $V_{pn}$ could be possibly zero, and to prevent the division by zero, an infinitesimal term $\delta_0$ must be provided.

Instead of the infinitesimal term $\delta_0$ in formula (3), in the case of the detected DC voltage $v_{pn}$ being below zero, it is also possible to prevent the division by zero by setting the maximum value of the predetermined PN voltage correction coefficient to the PN voltage correction coefficient $k_{pn}$.

That is, the PN voltage correction coefficient $k_{pn}$ may be calculated as shown in formula (4).

$$k_{pn} = \begin{cases} K_{pn\_max} & (v_{pn} \leq 0) \\ V_{pn0}/v_{pn} & (v_{pn} > 0) \end{cases} \quad (4)$$

where $K_{pn\_max}$ is the maximum value of predetermined PN voltage correction coefficient.

The first motor voltage command corrector 17 calculates the first corrected motor voltage commands, $v_{uh1}^*$, $v_{vh1}^*$, and $v_{wh1}^*$ as shown in formula (5) by using phase voltage commands, $v_u^*$, $v_v^*$, and $v_w^*$ and PN voltage correction coefficient $k_{pn}$.

$$\begin{cases} v_{uh1}^* = k_{pn} \cdot v_u^* \\ v_{vh1}^* = k_{pn} \cdot v_v^* \\ v_{wh1}^* = k_{pn} \cdot v_w^* \end{cases} \quad (5)$$

Further, the second voltage command corrector 19 calculates the second corrected motor voltage commands, $v_{uh2}^*$, $v_{vh2}^*$, and $v_{wh2}^*$ as shown in formula (6) only when, for example, $v_{uh1}^*$ of the first corrected motor voltage commands $v_{uh1}^*$, $v_{vh1}^*$, and $v_{wh1}^*$ is the maximum and $v_{uh1}^*$ exceeds the detected DC voltage $v_{pn}$ of the inverter 3.

$$\begin{cases} v_{uh2}^* = v_{uh1}^* \cdot v_{pn}/v_{uh1}^* \\ v_{vh2}^* = v_{vh1}^* \cdot v_{pn}/v_{uh1}^* \\ v_{wh2}^* = v_{wh1}^* \cdot v_{pn}/v_{uh1}^* \end{cases} \quad (6)$$

FIGS. 3A, and 3B show examples of results of the first corrected motor voltage commands, $v_{uh1}^*$, $v_{vh1}^*$, and $v_{wh1}^*$ calculated by the first motor voltage command corrector 17 finally corrected to the second corrected motor voltage commands, $v_{uh2}^*$, $v_{vh2}^*$, and $v_{wh2}^*$.

As shown in FIG. 3A, when all of the first corrected motor voltage commands, $v_{uh1}^*$, $v_{vh1}^*$, or $v_{wh1}^*$ does not exceed 240 V of the detected DC voltage $v_{pn}$, the second corrected motor voltage commands $v_{uh2}^*$, $v_{vh2}^*$, and $v_{wh2}^*$ are same values as the first corrected motor voltage commands $v_{uh1}^*$, $v_{vh1}^*$, and $v_{wh1}^*$.

Or, as shown in FIG. 3B, when $v_{uh1}^*$ of the first corrected motor voltage commands $v_{uh1}^*$, $v_{vh1}^*$, and $v_{wh1}^*$ exceeds 240 V of the detected DC voltage $v_{pn}$, the second corrected motor voltage commands $v_{uh2}^*$, $v_{vh2}^*$, and $v_{wh2}^*$ are 240 V, 144 V, and 0V respectively according to formula (6).

Figure 4:
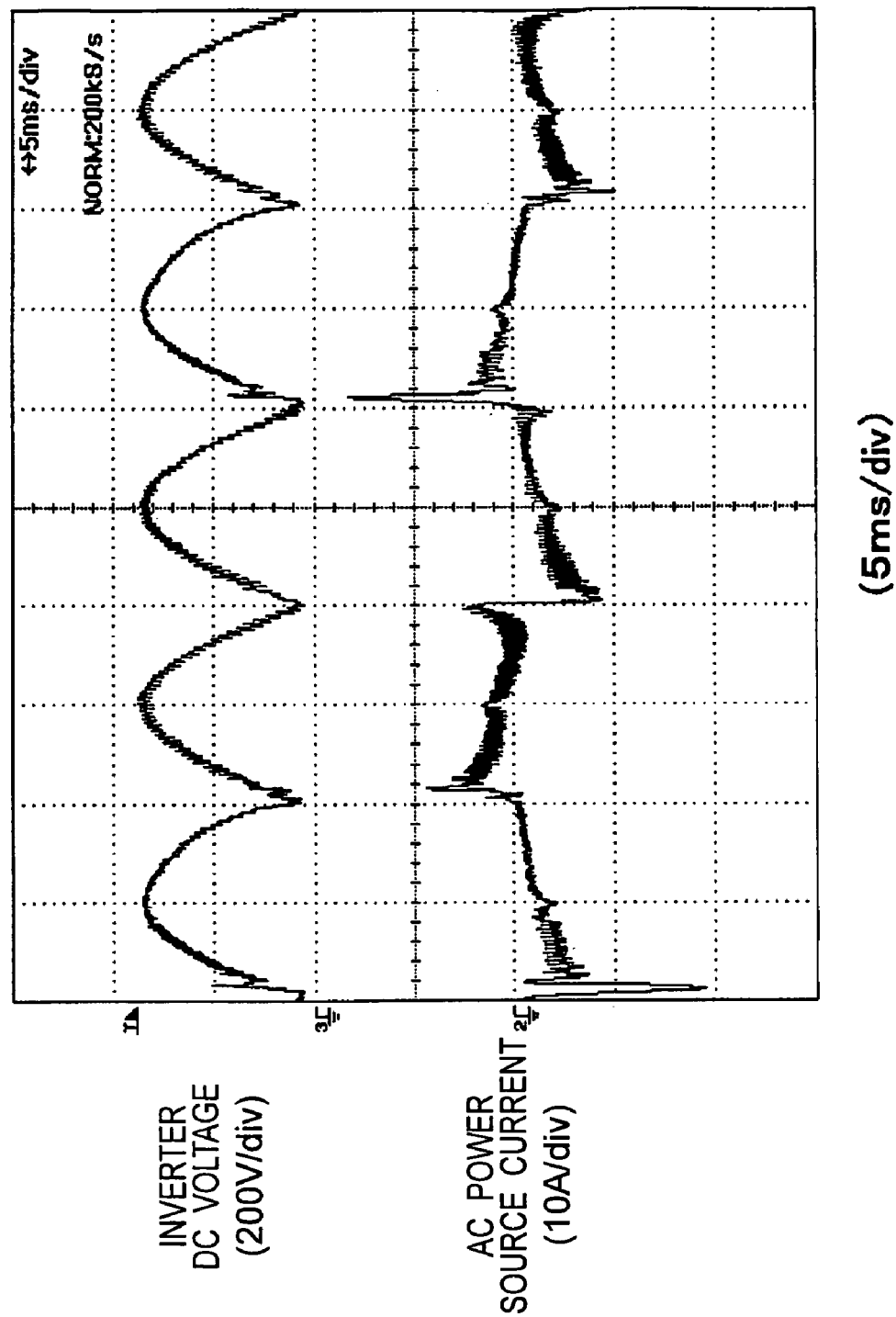
FIG. 4 is a diagram showing first operation results of the inverter control device for driving an induction motor in the first preferred embodiment of the invention.
Figure 5:
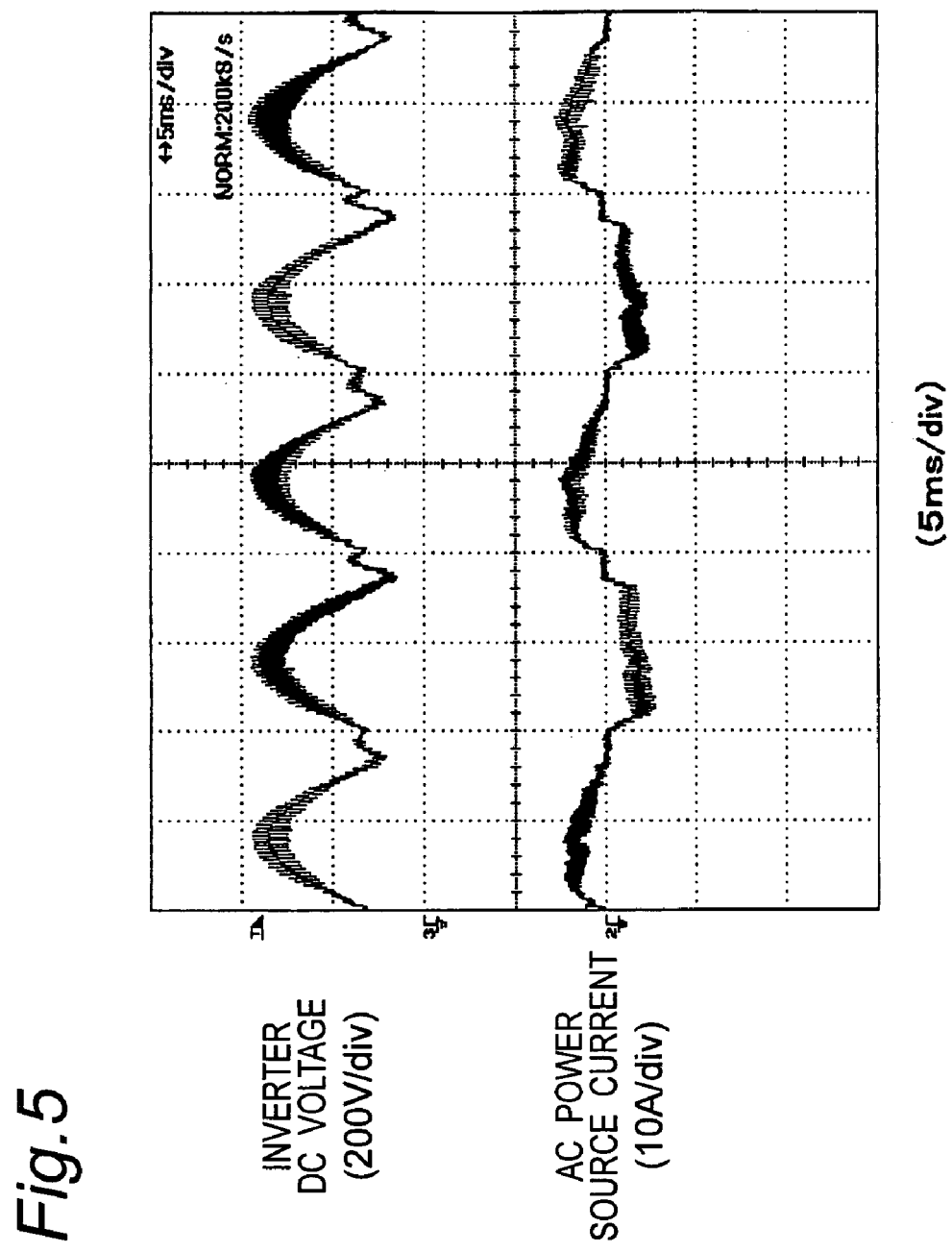
FIG. 5 is a diagram showing the second operation results of the inverter control device for driving an induction motor in the first preferred embodiment of the invention.

FIG. 4 shows waveforms of the inverter DC voltage and AC power source current in the case that no correction control is executed by the second motor voltage command corrector 19, and FIG. 5 shows waveforms of the inverter DC voltage and AC power source current in the case that the correction control is executed by the second motor voltage command corrector 19. As shown in FIG. 5, by correction by the second motor voltage command corrector 19, without applying a voltage excessively to the induction motor immediately after substantial drop of the inverter DC voltage, fluctuations of the AC power source current are suppressed, the power factor of AC power source is improved, and harmonic components of AC power source current are suppressed.

Thus, in the inverter control device of this embodiment, since the voltage command of each phase is corrected by using the PN voltage correction coefficient, a nearly constant motor voltage is applied even though fluctuations of the PN voltage occur. Hence a capacitor with large capacity is not needed, and a capacitor with small capacity can be used. By using the small capacity capacitor, the input current always flows into the motor, and the power factor of the input current is raised, so that the reactor can be reduced in size.

Use of the small capacity capacitor and the small capacity reactor can provide the inverter control device for driving an induction motor which is small in size, light weight, and low cost. Accordingly, even if the inverter DC voltage fluctuates largely and driving an induction motor is difficult or even impossible, the inverter can be operated so that the voltage applied to the induction motor may be almost constant, and driving an induction motor may be maintained.

It should be noted that the invention is not limited to the inverter control device for driving an induction motor by V/F control as mentioned in this embodiment but the invention may be also applied in an inverter control device for driving induction motor by known vector control.

It should be noted that the invention can be also applied to both the case in that speed sensors such as pulse generators cannot be used as in compressor driving motors in air conditioners and the case of using speed sensors such as servo drives.

Embodiment 2

Figure 6:
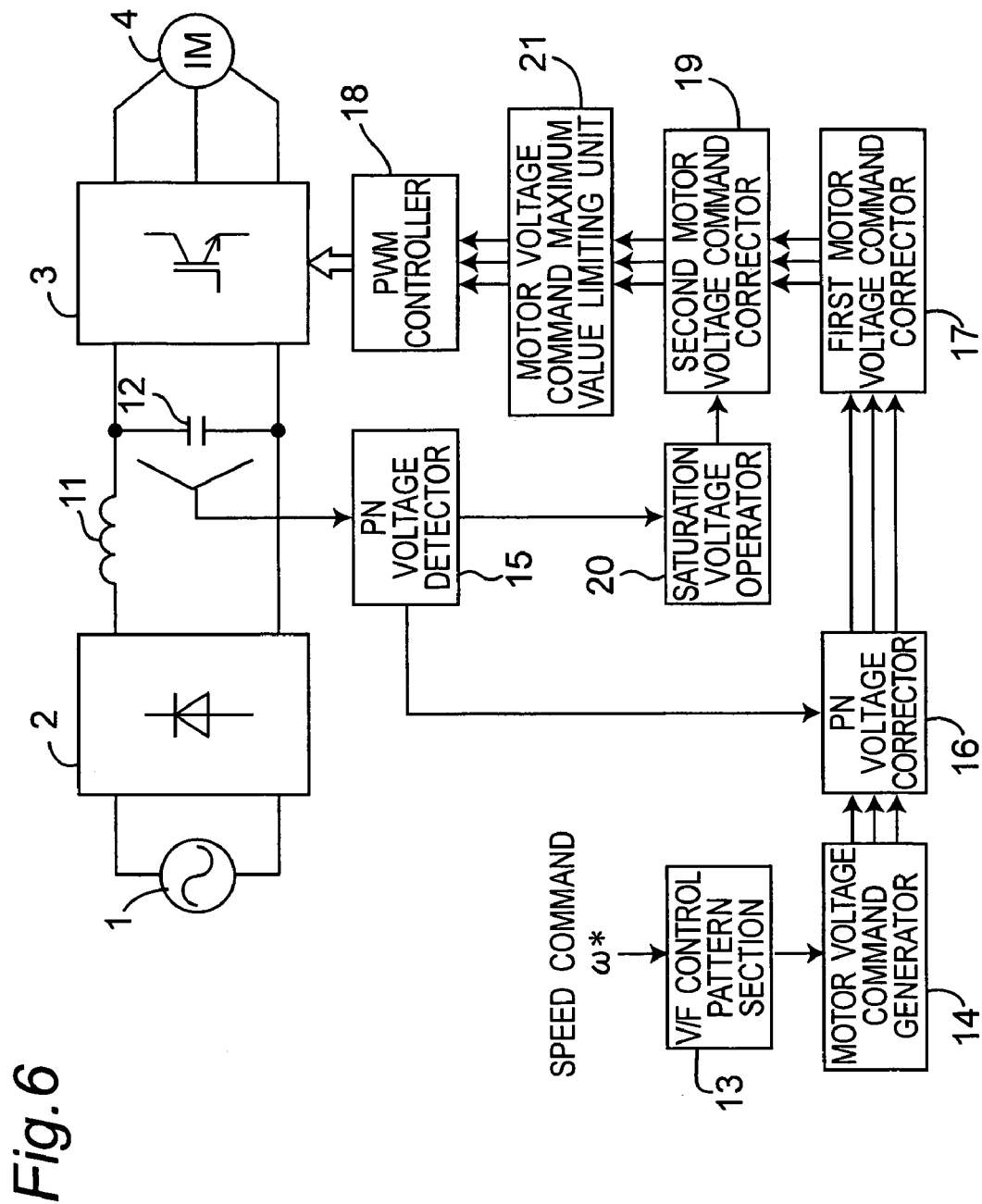
FIG. 6 is a system block diagram of the inverter control device for driving an induction motor in the second preferred embodiment of the invention.

FIG. 6 is a system block diagram of an inverter driving device for driving an induction motor in the second preferred embodiment of the invention. In FIG. 6, the main circuit is the same as in Embodiment 1.

On the other hand, the control circuit further includes a saturation voltage operator 20 and a motor voltage command maximum value limiting section 21, in addition to the configuration in Embodiment 1.

The functions of the V/F control pattern section 13, motor voltage command generator 14, PN voltage detector 15, PN voltage corrector 16, and the first motor voltage command corrector 17 are same as in Embodiment 1.

The saturation voltage operator 20 calculates a reference saturation voltage by multiplying the inverter DC voltage by a value of 1 or more. The second motor voltage command corrector 19 generates the second corrected motor voltage command of the induction motor 4 only when any one of the first corrected motor voltage commands generated in the first motor voltage command corrector 17 is larger than the reference saturation voltage calculated in the saturation voltage operator 20, by multiplying the first corrected motor voltage command by the reference saturation voltage calculated in the saturation voltage operator 20, and dividing the product of multiplication by the maximum value of the first corrected motor voltage command.

When the second corrected motor voltage command provided by the second motor voltage command corrector 19 is larger than the inverter DC voltage value, the motor voltage command maximum value limiting section 21 calculates the third corrected motor voltage command by which the second corrected motor voltage command is set to the inverter DC voltage value. The PWM controller 18 generates PWM signals of the inverter 3 on the basis of the third corrected motor voltage command produced from the motor voltage command maximum value limiting section 21.

Operation different from that of Embodiment 1 is described below.

The saturation voltage operator 20 calculates the reference saturation voltage $V_{pn1}$ as shown in formula (7).

$$V_{pn1} = K \cdot v_{pn} \quad (K \geq 1) \tag{7}$$

In this formula (7), K denotes a voltage saturation rate, which is about 1 to 1.5.

The second motor voltage command corrector 19 calculates the second corrected motor voltage commands, $v_{uh2}^*$, $v_{vh2}^*$, and $v_{wh2}^*$ as shown in formula (8), only when, for example, $v_{uh1}^*$ of the first corrected motor voltage commands $v_{uh1}^*$, $v_{vh1}^*$, and $v_{wh1}^*$ is the maximum and $v_{uh1}^*$ exceeds the reference saturation voltage $V_{pn1}$ obtained in the saturation voltage operator 20.

$$\begin{cases} v_{uh2}^* = v_{uh1}^* \cdot v_{pn1} / v_{uh1}^* \\ v_{vh2}^* = v_{vh1}^* \cdot v_{pn1} / v_{uh1}^* \\ v_{wh2}^* = v_{wh1}^* \cdot v_{pn1} / v_{uh1}^* \end{cases} \tag{8}$$

Further, in the motor voltage command maximum value limiting section 21, when the second corrected motor voltage commands $v_{uh2}^*$, $v_{vh2}^*$, and $v_{wh2}^*$ are larger than the detected DC voltage $v_{pn}$, the third corrected motor voltage commands $v_{uh3}^*$, $v_{vh3}^*$, and $v_{wh3}^*$ obtained by limiting the maximum of the detected DC voltage $v_{pn}$ are calculated.

Figure 7A:
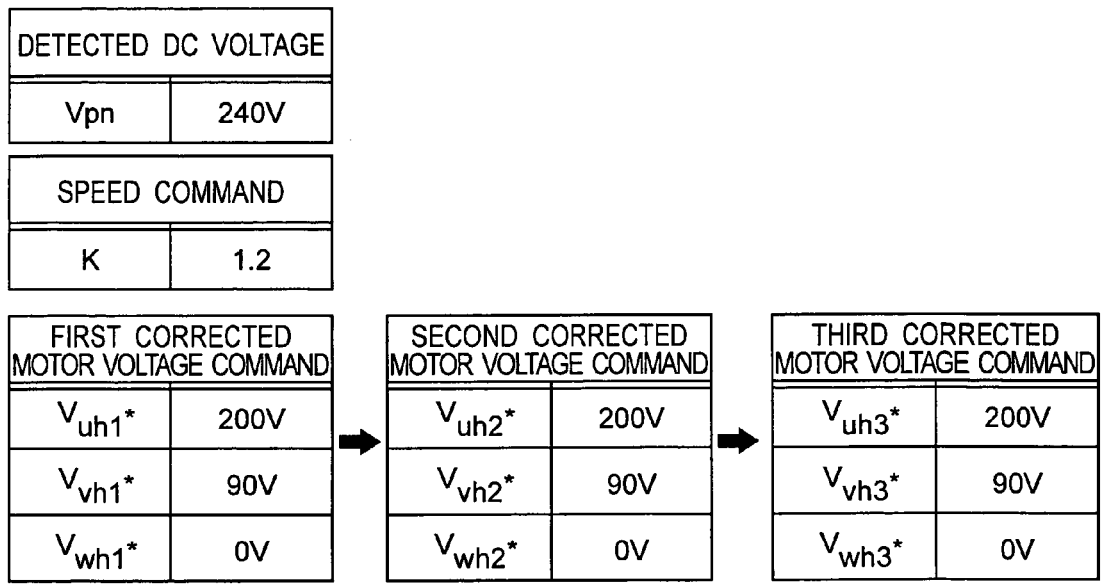
FIGS. 7A and 7B are diagrams showing results of corrected motor voltage command in the second preferred embodiment of the invention.
Figure 7B:
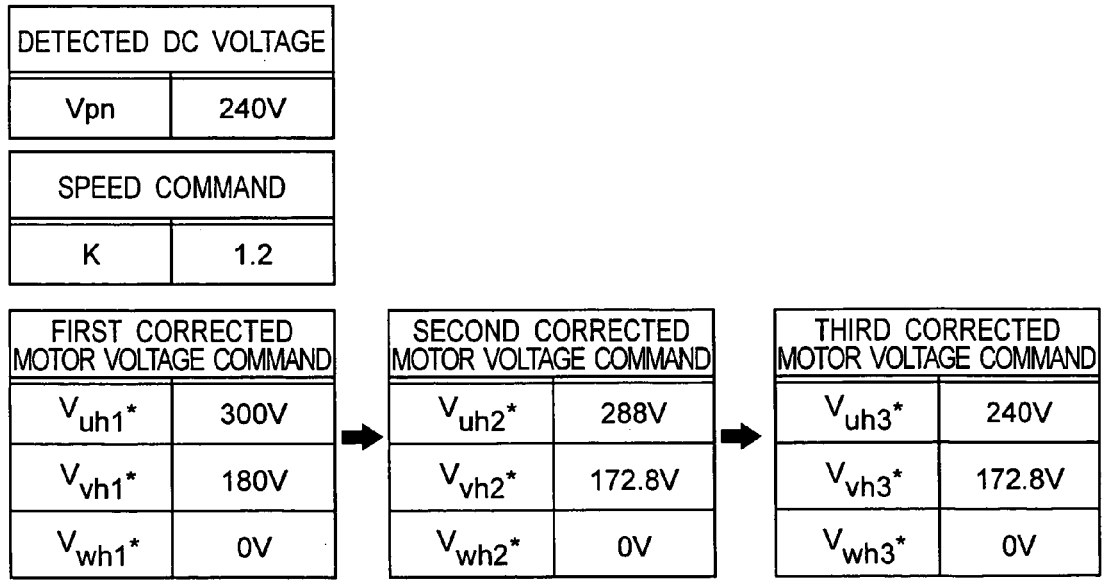

FIGS. 7A and 7B show examples of results of the first corrected motor voltage commands $v_{uh1}^*$, $v_{vh1}^*$, and $v_{wh1}^*$ calculated by the first motor voltage command corrector 17 finally corrected to the third corrected motor voltage commands, $v_{uh3}^*$, $v_{vh3}^*$, and $v_{wh3}^*$ when the voltage saturation rate K used in the saturation voltage operator 20 is 1.2.

As shown in FIG. 7A when none of the first motor voltage commands $v_{uh1}^*$, $v_{vh1}^*$ or $v_{wh1}^*$ is over 240 V of the detected DC voltage $v_{pn}$, the third corrected motor voltage commands $v_{uh3}^*$, $v_{vh3}^*$, and $v_{wh3}^*$ are the same values as the first corrected motor voltage commands $v_{uh1}^*$, $v_{vh1}^*$ or $v_{wh1}^*$.

As shown in FIG. 7B, when $v_{uh1}^*$ of the first corrected motor voltage commands $v_{uh1}^*$, $v_{vh1}^*$ or $v_{wh1}^*$ is over 240 V of the detected DC voltage $v_{pn}$, according to formulas (7) and (8), the second corrected motor voltage commands, $v_{uh2}^*$, $v_{vh2}^*$, and $v_{wh2}^*$ are 288 V, 172.8 V, and 0 V, respectively, and finally the third corrected motor voltage commands $v_{uh3}^*$, $v_{vh3}^*$, and $v_{wh3}^*$ are 240 V, 172.8 V, and 0 V, respectively.

Of the specific examples explained in Embodiment 1, comparing FIG. 3B and FIG. 7B, it is known that the motor voltage value finally commanded to phase V is increased from 144 V to 172.8 V in Embodiment 2.

Increase in the motor voltage leads to increase in the output torque of the induction motor, and if the desired power factor of the AC power source or harmonic components of the AC power source current may have a margin to a regulation value, this preferred embodiment may be a very effective means for raising the limit load tolerance of the induction motor.

Embodiment 3

In this preferred embodiment, in calculating the reference saturation voltage $V_{pn1}$, the voltage saturation rate is varied depending on the speed command from outside.

Figure 8:
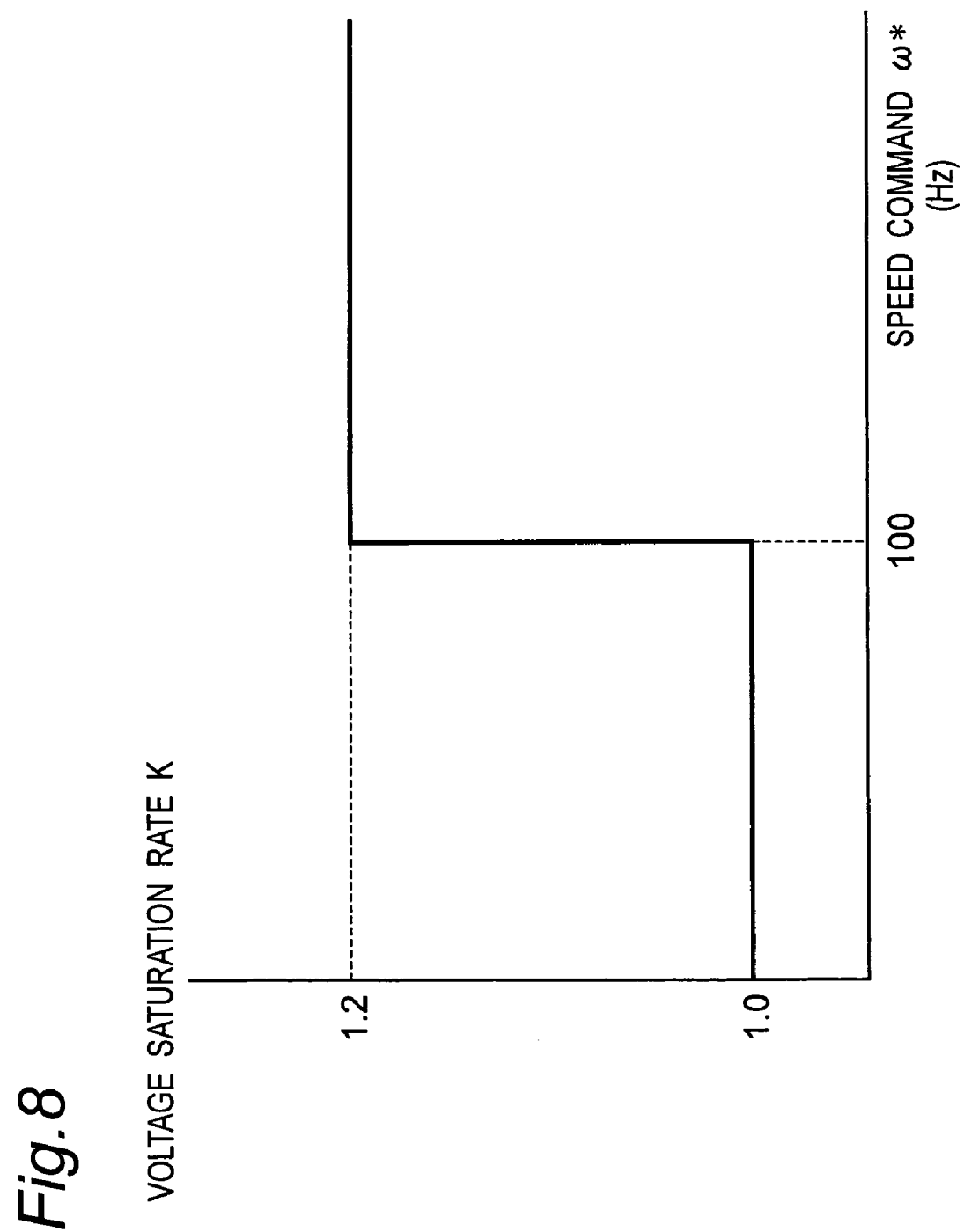
FIG. 8 is the first characteristic diagram of voltage saturation rate in the third preferred embodiment of the invention.

FIG. 8 shows an example of step-wise changes of the voltage saturation rate K in formula (7) depending on the speed command $\omega^*$ of the induction motor 4 given from outside when the reference saturation voltage $V_{pn1}$ is calculated by the saturation voltage operator 20 in the inverter control device of Embodiment 2.

As shown in FIG. 8, by changing step-wise the voltage saturation rate K, the saturation voltage reference value $V_{pn1}$ is the same value as the DC voltage detection value $v_{pn}$, when the speed command $\omega^*$ is less than 100 Hz, and the control is the same as explained in Embodiment 1.

When the speed command $\omega^*$ is 100 Hz or more, the reference saturation voltage $V_{pn1}$ is 1.2 times the detected DC voltage $v_{pn}$, and the control is the same as explained in Embodiment 2.

That is, when the speed command ω* is less than 100 Hz, the power factor of the AC power source is improved and the harmonic components of the AC power source current can be suppressed securely, and when the speed command ω* is 100 Hz or more, the output torque of the induction motor 4 is assured sufficiently.

According to the present embodiment, the flexible control is realized, that is, the power factor of the AC power source is improved and the harmonic components of the AC power source current can be suppressed securely in a stationary driving region of the induction motor, while the limit of withstand load can be raised in a high speed driving region where the motor requires enough torque.

Figure 9:
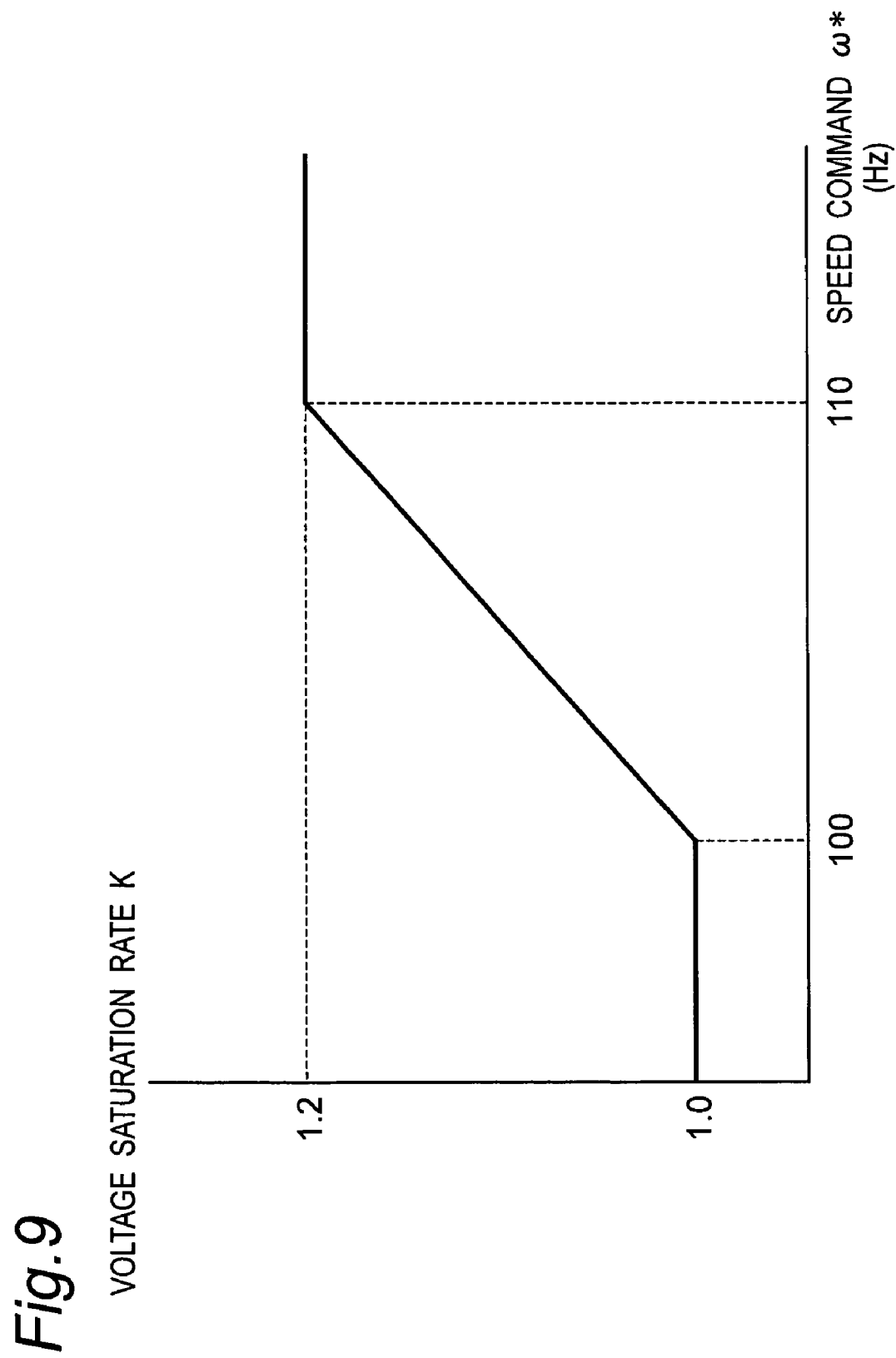
FIG. 9 is the second characteristic diagram of voltage saturation rate in the third preferred embodiment of the invention.

Incidentally, as show in FIG. 9, by varying the voltage saturation rate K continuously and smoothly depending on the speed command ω*, sudden changes of output torque can be prevented, and stable driving is realized.

Embodiment 4

A specific setting method of the inverter operating frequency of the invention is described below.

Figure 10:
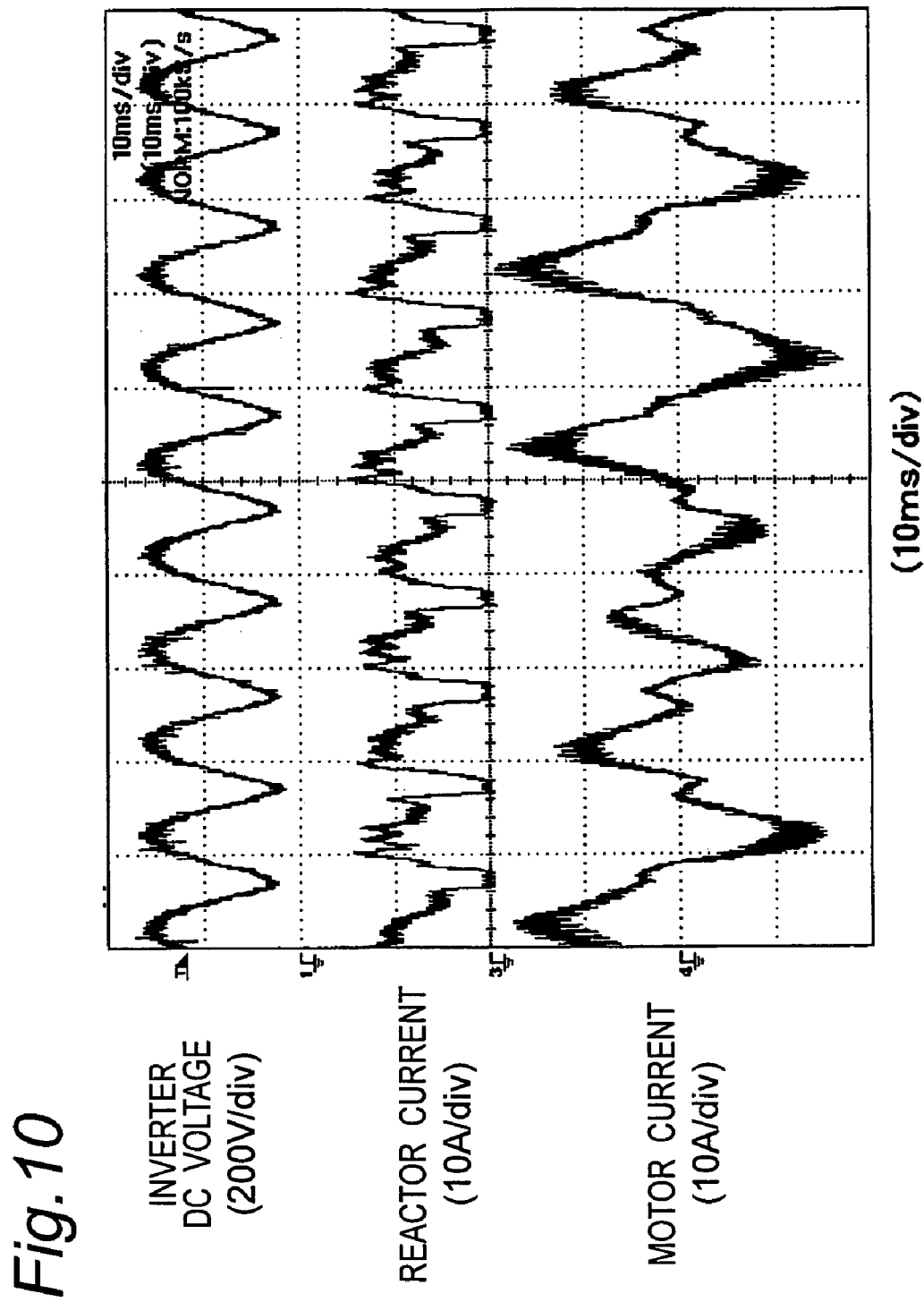
FIG. 10 is a diagram showing the first operation results of the inverter control device for driving an induction motor in the fourth preferred embodiment of the invention.

Since a capacitor with small capacity is used in the inverter control device for driving an induction motor of the invention, the inverter DC voltage pulsates largely at a double frequency of the AC power source frequency $f_s$ as shown in FIG. 10.

Accordingly, at the frequency where the inverter operating frequency $f_1$ is an even number multiple of a frequency $f_s$ of the AC power source, the inverter DC voltage is synchronized with the pulsating frequency (double frequency of the AC power source frequency $f_s$), and resonance phenomenon takes place.

Figure 11:
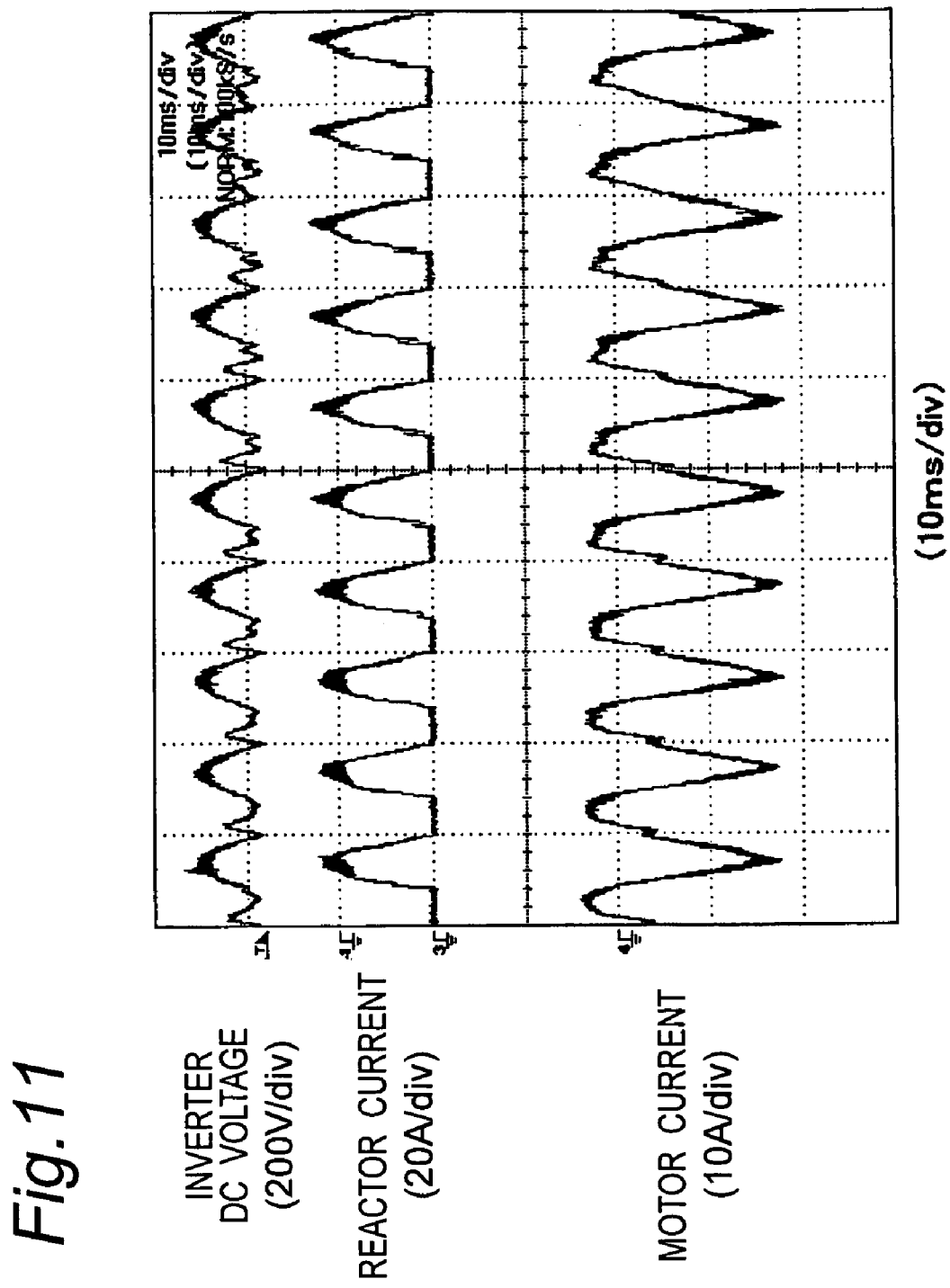
FIG. 11 is a diagram showing the second operation results of the inverter control device for driving an induction motor in the fourth preferred embodiment of the invention.

FIG. 11 shows the operation result when the inverter operating frequency $f_1$ is a double frequency of the AC power source frequency $f_s$. It is known that the inverter DC voltage is synchronized with the pulsating frequency, the resonance phenomenon occurs, and a negative DC component is superposed on the motor current. As a result, a brake torque is generated in the induction motor, and adverse effects are caused, such as decrease in output torque and increase in motor loss.

In FIG. 11, the dimensions are as follows: the inductance of small capacity reactor is 0.5 mH, the capacity of small capacity capacitor is 10 μF, the AC power source is 220 V (50 Hz), the inverter operating frequency is 100 Hz (herein since the number of poles of the motor is 2, the inverter operating frequency and motor speed command are equal to each other), and the inverter carrier frequency is 5 kHz.

In this embodiment, regarding setting of the inverter operating frequency $f_1$, the inverter operating frequency f1 is determined so as to prevent the inverter operating frequency $f_1$ from being fixed stationarily to the frequency (frequency range) given in formula (9).

$$f_1 = 2nf_s \pm \Delta f \quad (9)$$

where n is an integer, and Δf is a predetermined frequency width, and the frequency width Δf is basically determined so as to decrease the effects of the resonance phenomenon.

If the inverter operating frequency $f_1$ exceeds the resonant frequency determined in formula (9), the inverter operating frequency $f_1$ is changed instantly in a transient state of acceleration or deceleration, thereby preventing the inverter operating frequency $f_1$ from being fixed at the resonant frequency.

The frequency width Δf may not be always set, and it may not be set (to be set at Δf=0 in this case) depending on the operating status (such as light load).

Hence, by avoiding resonance phenomenon of the inverter frequency and AC power source frequency, unstable action of the induction motor can be prevented and stable driving can be realized.

Embodiment 5

The following is a specific method about determination of specification of the small capacity capacitor 12 and small capacity reactor 11 used in the inverter control device of the invention.

The inverter control device of the invention, in order to suppress harmonic components of the AC power source current and satisfy the IEC standard, determines the combination of the small capacity capacitor 12 and small capacity reactor 11 so that the resonant frequency fLC (LC resonant frequency) determined by the small capacity capacitor and small capacity reactor may be more than 40 times of the AC power source frequency fs.

Herein, using the capacity of the small capacity capacitor 12 to be C [F], and the inductance of the small capacity reactor 11 to be L [H], the LC resonant frequency fLC is expressed in formula (10).

$$f_{LC} = \frac{1}{2\pi\sqrt{LC}} \quad (10)$$

That is, the combination of the small capacity capacitor 12 and small capacity reactor 11 is determined to satisfy the condition of fLC>40 fs. This is because the IEC standard specifies up to the higher harmonics of the degree of 40 in the harmonic components of AC power source current.

The determination of the combination of the small capacity capacitor 12 and small capacity reactor 11 in the above method can suppress harmonic components of the AC power source current, and clear the IEC standard.

The following is to explain the determination of capacity of the small capacity capacitor 12.

When the inverter 3 is stopped, the small capacity capacitor 12 absorbs the regenerative energy of the induction motor 4 (magnetic energy accumulated in the inductance component of the induction motor immediately before stopping), and thus the DC voltage of the inverter 3 elevates. Therefore the capacity of the small capacity capacitor 12 is determined so that the maximum value of the DC voltage at this time may be smaller than the withstand voltage of the component elements of the peripheral circuits of the inverter 3. As a result, breakdown of peripheral circuits can be prevented.

The inductance value of the small capacity reactor 11 is determined automatically in the above method once the value of the small capacity capacitor 12 is determined.

Embodiment 6

The following is a specific method about setting a carrier frequency of the inverter 3 of the invention.

The inverter control device of the invention is small in the electric energy accumulated in the small capacity capacitor 12. In order to maintain driving of the induction motor even if the electric energy is insufficient, magnetic energy of the small capacity reactor 11 must also be used, and hence the reactor current waveform (the current after passing through the diode bridge, being approximately equal to the absolute value of the AC power source current) is largely influenced by the carrier frequency (chopping) of the inverter 3.

Therefore, the inverter control device of the invention sets the carrier frequency of the inverter 3 so as to satisfy the predetermined power factor of the AC power source.

Figure 12:
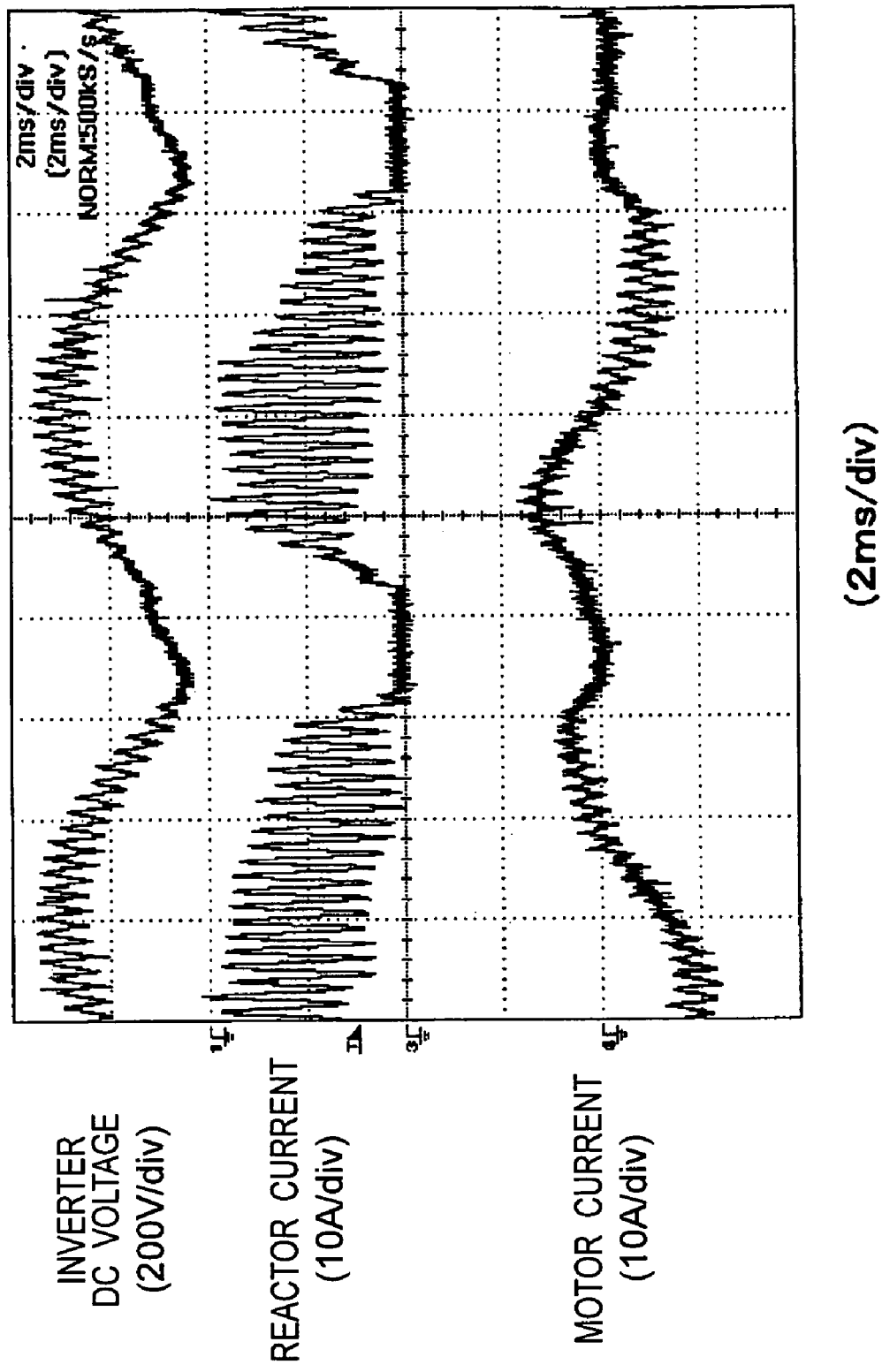
FIG. 12 is a diagram showing first operation results of the inverter control device for driving an induction motor in the sixth preferred embodiment of the invention.
Figure 13:
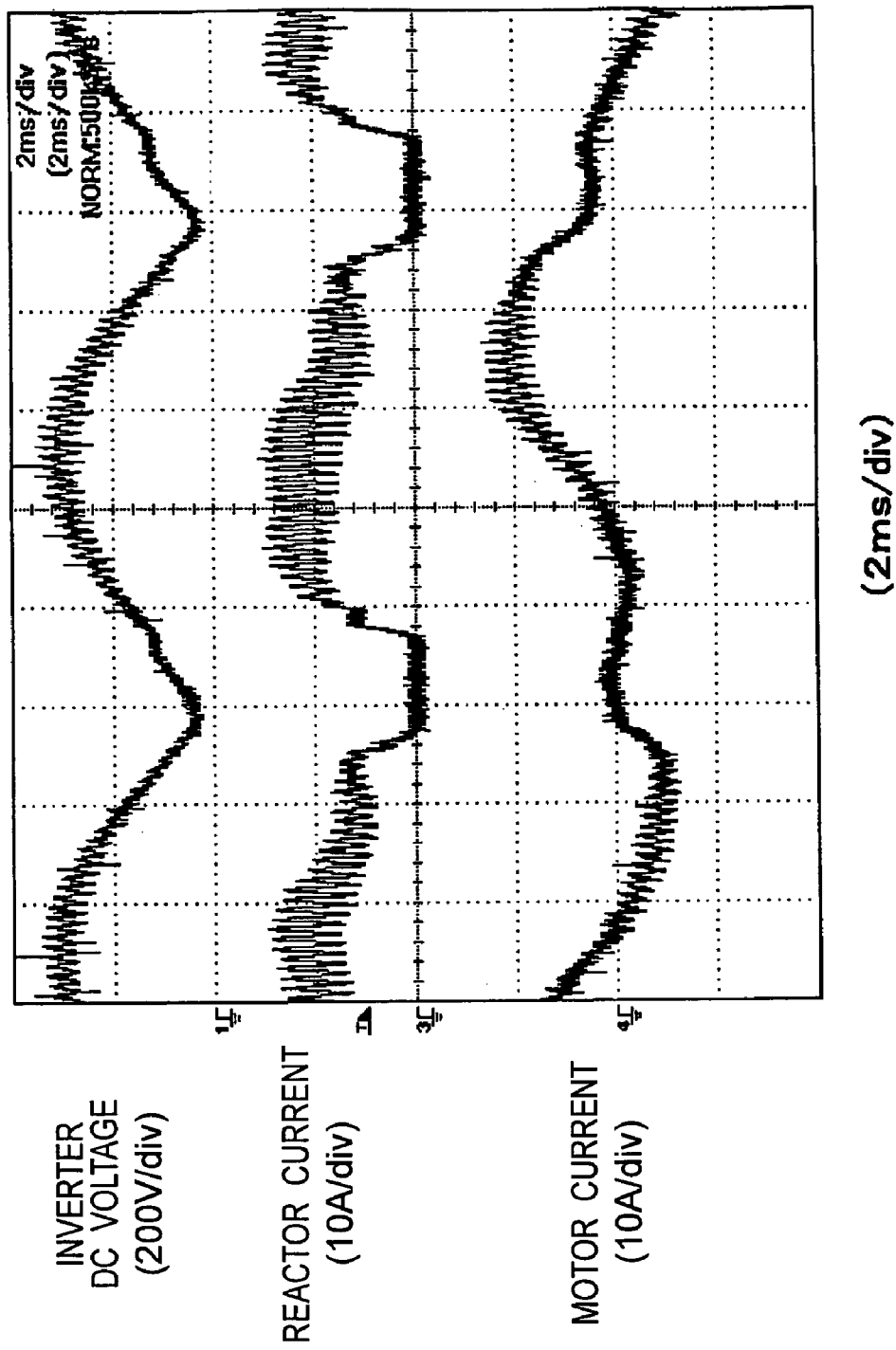
FIG. 13 is a diagram showing second operation results of the inverter control device for driving an induction motor in the sixth preferred embodiment of the invention.
Figure 14:
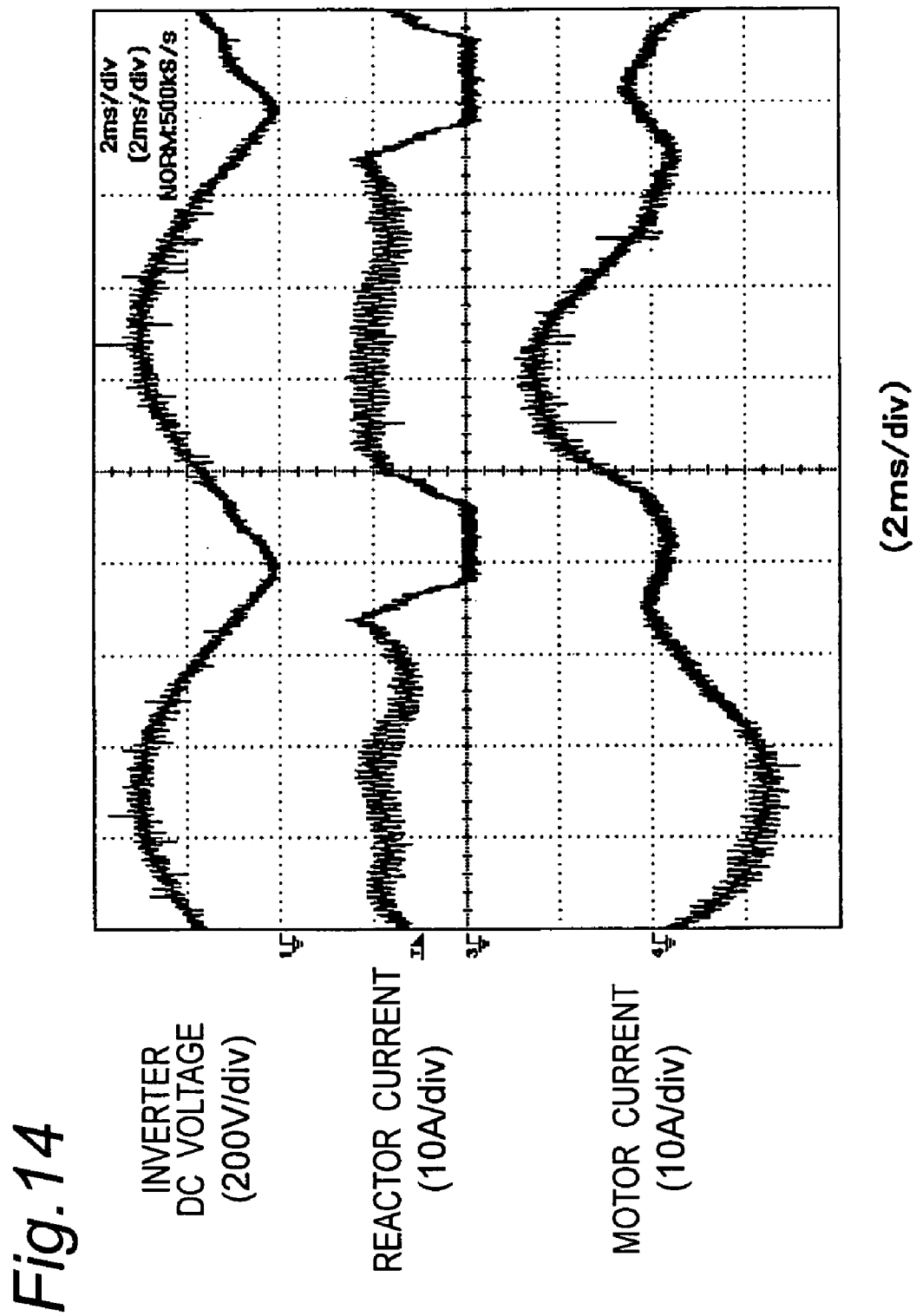
FIG. 14 is a diagram showing the third operation results of the inverter control device for driving an induction motor in the sixth preferred embodiment of the invention.

Results of operation of the inverter control device of the invention in various conditions are shown in FIG. 12 to FIG. 14. FIG. 12 shows the operation result at carrier frequency of 3.3 kHz, FIG. 13 at 5 kHz, and FIG. 14 at 7.5 kHz. Comparing the reactor current waveforms, it is known that the reactor current (or AC power source current) depends largely on the carrier frequency.

The power factor of each AC power source was measured by a digital power meter, and it was 0.878 at the carrier frequency of 3.3 kHz in FIG. 12, 0.956 at 5 kHz in FIG. 13, and 0.962 at 7.5 kHz in FIG. 14.

At this time, the dimensions are as follows: the inductance of small capacity reactor 11 is 0.5 mH, the capacity of small capacity capacitor 12 is 10 µF, the voltage of the AC power source 1 is 220 V (50 Hz), the inverter operating frequency is 57 Hz (herein since the number of poles of the motor 4 is 2, the inverter operating frequency is equal to the value of the motor speed command), and the input power of the AC power source 1 is 900 W.

Herein, when the predetermined power factor of the AC power source is 0.9, it is enough to set the carrier frequency somewhere between 3.3 kHz and 5 kHz, and finally the carrier frequency is set to the lowest value while satisfying the predetermined power factor of the AC power source (in this case, 0.9).

Thus, the predetermined power factor of the AC power source can be satisfied, and by setting the minimum required limit of the carrier frequency, the inverter loss can be suppressed to a minimum limit.

Embodiment 7

Figure 15:
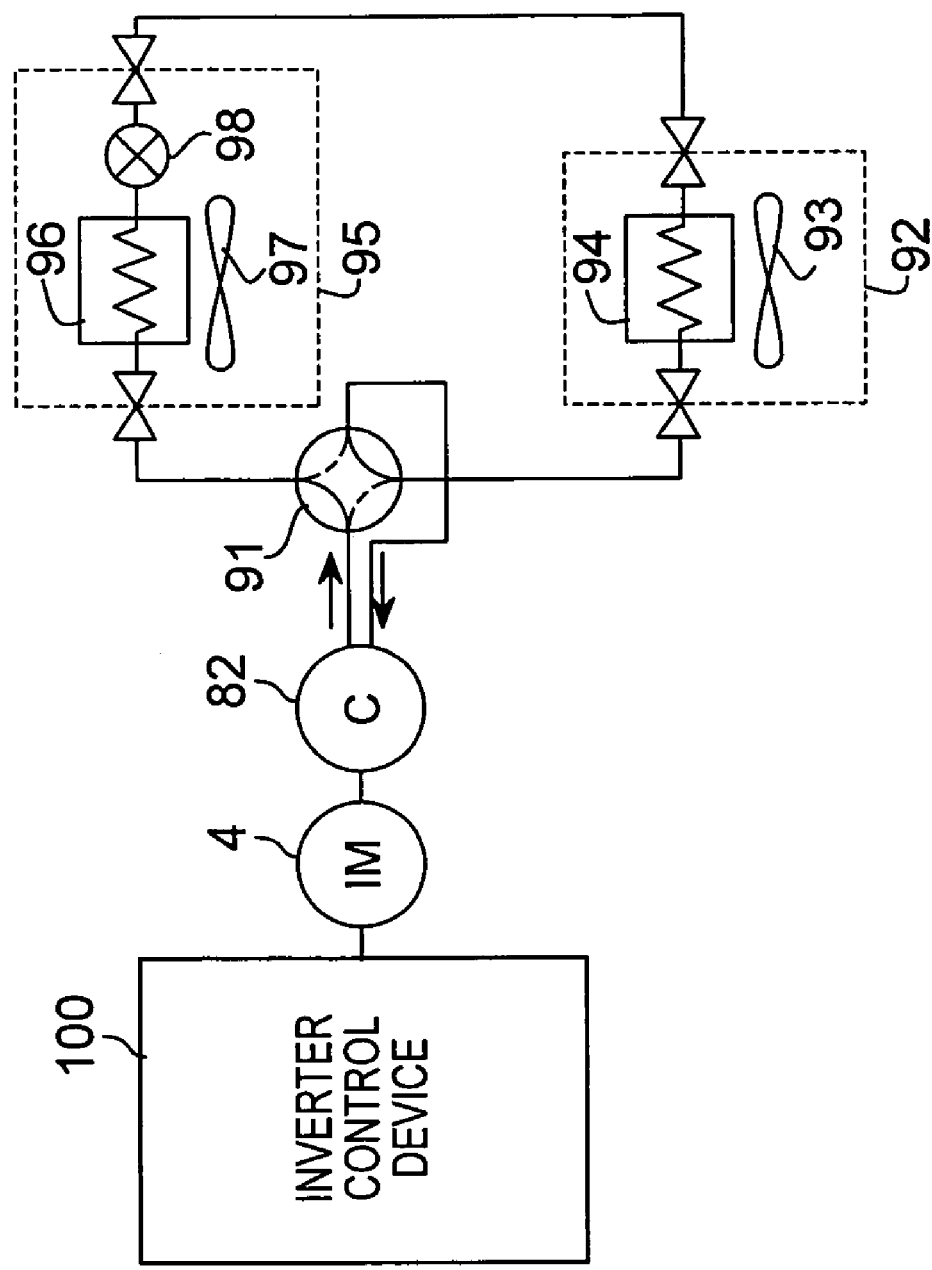
FIG. 15 is a block diagram showing a configuration of a preferred embodiment of air conditioner according to the invention.

FIG. 15 shows an example of a structure of an air conditioner using the inverter control device described above. As shown in the diagram, the air conditioner uses the inverter control device 100 described above, and further has a compressor 82, and a refrigeration cycle including an indoor unit 92, an outdoor unit 95, and a four-way valve 91. The indoor unit 92 includes an indoor blower 93 and an indoor heat exchanger 94, and the outdoor unit 95 includes an outdoor heat exchanger 96, an outdoor blower 97, and an expansion valve 98.

The compressor 82 is driven by the induction motor 4, and the induction motor 4 is driven by the inverter control device 100. A refrigerant which is a medium conveying heat circulates in the refrigeration cycle. The refrigerant is compressed by the compressor 82, and is exchanged in heat with the outdoor air by the air blow from the outdoor blower 97 by means of the outdoor heat exchanger 96, and is further exchanged in heat with the indoor air by the air blow from the indoor blower 93 by means of the indoor heat exchanger 94.

In the foregoing preferred embodiments, the induction motor is explained, but the invention may be also applied in other motors as well.

INDUSTRIAL APPLICABILITY

The invention presents an inverter control device for driving a motor with small size, light weight and low cost, and it is useful as a control device of a motor used in an air conditioner or the like.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application Nos. 2003-91184, filed on Mar. 28, 2003, and 2004-054292, filed on Feb. 27, 2004, which are expressly incorporated herein by reference in their entirety.

What is claimed is:

1. An inverter control device for driving a motor, including a rectifying circuit for converting an AC power from an AC power source into a DC power, and an inverter for converting the DC power from the rectifying circuit into an AC power with a desired frequency and a desired voltage to supply the converted AC power into a motor, the rectifying circuit including a diode bridge, and a reactor of a predetermined small capacity connected to the AC input side or DC output side of the diode bridge, the inverter control circuit having a capacitor with a predetermined small capacity for absorbing the regenerative energy of the motor between DC buses of the inverter, the inverter control device comprising:

a motor voltage command generator that generates a voltage command of each phase of the motor on the basis of a speed command of the motor given from outside;

a voltage detector that detects a DC voltage of the inverter;

a voltage corrector that compares the inverter DC voltage the voltage detector with a predetermined reference value, and calculates a voltage correction coefficient from the result of the comparison, a first motor voltage command corrector that corrects the each phase voltage command, and a second motor voltage command corrector that corrects again the each phase voltage command corrected by the first motor voltage command corrector, wherein the first motor voltage command corrector corrects the each phase voltage command by multiplying the each phase voltage command obtained from the first motor voltage command generator by the voltage correction coefficient produced from the voltage corrector, and the second motor voltage command corrector corrects again the each phase voltage command once corrected by the first motor voltage command corrector, only when any one of the phase voltage commands corrected by the first motor voltage command corrector is larger than the inverter DC voltage, by multiplying the voltage command of each phase corrected by the first motor voltage command corrector by the inverter DC voltage value, and dividing the product of the multiplication by the maximum value of the phase voltage commands corrected by the first motor voltage command corrector.

2. The inverter control device according to claim 1, wherein the voltage corrector calculates the voltage correction coefficient by dividing the predetermined reference value by the detected DC voltage when the detected DC voltage is not zero, and sets the maximum value of the predetermined voltage correction coefficient to the voltage correction coefficient when the detected DC voltage is below zero.

3. The inverter control device according to claim 1, wherein an inverter operating frequency is set so as to prevent the inverter operating frequency from stationary fixing in a frequency range having a predetermined margin around the resonant frequency which is a frequency of an even number multiple of AC power source frequency.

4. The inverter control device a ccording to claim 1, wherein combination of the small capacity reactor and the small capacity capacitor is determined so that the resonant frequency of the small capacity reactor and the small capacity capacitor is larger than 40 times of the AC power source frequency.

5. The inverter control device according to claim 1, wherein the capacity of the small capacity capacitor is determined so that the maximum value of the DC voltage elevating when the inverter is stopped is smaller than withstand voltages of electric devices included in peripheral circuits of the inverter.

6. The inverter control device according to claim 1, wherein the carrier frequency of the inverter is determined so that a power factor value of the AC power source is a predetermined value.

7. An inverter control device for driving a motor, including a rectifying circuit for converting an AC power from an AC power source into a DC power, and an inverter for converting the DC power from the rectifying circuit into an AC power with a desired frequency and a desired voltage to supply the converted AC power into a motor, the rectifying circuit including a diode bridge and a reactor with a predetermined small capacity connected to the AC input side or DC output side of the diode bridge, the inverter control device having a capacitor with a predetermined small capacity for absorbing the regenerative energy of the motor between DC buses of the inverter, the inverter control device comprising:

a motor voltage command generator that generates a voltage command of each phase of the motor on the basis of a speed command of the motor given from outside;

a voltage detector that detects a DC voltage of the inverter;

a voltage corrector that compares the inverter DC voltage detect by the voltage detector with a predetermined reference value, and calculates a voltage correction coefficient from the result of the comparison;

a first motor voltage command corrector that corrects the voltage command of each phase by multiplying the each phase voltage command obtained from the first motor voltage command generator by the voltage correction coefficient produced from the voltage corrector, a saturation voltage operating section that calculates a reference saturation voltage by multiplying the inverter DC voltage by a value of 1 or more;

a second motor voltage command corrector that corrects again the voltage command of each phase corrected by the first motor voltage command corrector, only when any one of the phase voltage commands calculated by the first motor voltage command corrector is larger than the reference saturation voltage calculated in the saturation voltage operating section, by multiplying the voltage command of each phase value corrected by the first motor voltage command corrector by the reference saturation voltage calculated in the saturation voltage operating section, and dividing the product of the multiplication by the maximum value of the phase voltage commands corrected by the first motor voltage command corrector; and a motor voltage command maximum value limiting section that determines the voltage command of each phase as the inverter DC voltage when the voltage command of each phase corrected by the second motor voltage command corrector is larger than the inverter DC voltage.

8. The inverter control device according to claim 7, wherein the reference saturation voltage obtained from the saturation voltage operating section is variable with the speed command of the motor given from outside.

9. The inverter control device according to claim 7, wherein the voltage corrector calculates the voltage correction coefficient by dividing the predetermined reference value by the detected DC voltage when the detected DC voltage is not zero, and sets the maximum value of the predetermined voltage correction coefficient to the voltage correction coefficient when the detected DC voltage is below zero.

10. The inverter control device according to claim 7, wherein an inverter operating frequency is set so as to prevent the inverter operating frequency from stationary fixing in a frequency range having a predetermined margin around the resonant frequency which is a frequency of an even number multiple of AC power source frequency.

11. The inverter control device a ccording to claim 7, wherein combination of the small capacity reactor and the small capacity capacitor is determined so that the resonant frequency of the small capacity reactor and the small capacity capacitor is larger than 40 times of the AC power source frequency.

12. The inverter control device according to claim 7, wherein the capacity of the small capacity capacitor is determined so that the maximum value of the DC voltage elevating when the inverter is stopped is smaller than withstand voltages of electric devices included in peripheral circuits of the inverter.

13. The inverter control device according to claim 7, wherein the carrier frequency of the inverter is determined so that a power factor value of the AC power source is a predetermined value.

14. An air conditioner comprising:

a compressor for compressing a refrigerant;

a motor for driving the compressor; and an inverter control device according to claim 1 for converting the DC power from the rectifying circuit into the AC power with a variable voltage and a variable frequency to supply the converted AC power into the motor.

15. An air conditioner comprising:

a compressor for compressing a refrigerant;

a motor for driving the compressor; and an inverter control device according to claim 7 for converting the DC power from the rectifying circuit into the AC power with a variable voltage and a variable frequency to supply the converted AC power into the motor.

* * * * *